(12) United States Patent
Wong et al.

(10) Patent No.: US 11,644,941 B1
(45) Date of Patent: May 9, 2023

(54) MANIPULATION OF ANIMATION TIMING

(71) Applicant: Apple Inc., Cupertino, CA (US)

(72) Inventors: Karen Natalie Wong, Sunnyvale, CA (US); James Graham McCarter, Erie, CO (US); Jee Young Park, San Bruno, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/350,228

(22) Filed: Jun. 17, 2021

Related U.S. Application Data

(60) Provisional application No. 63/063,789, filed on Aug. 10, 2020.

(51) Int. Cl.
| | | |
|---|---|---|
| *G06F 3/04815* | (2022.01) | |
| *G06F 3/04845* | (2022.01) | |
| *G06T 19/00* | (2011.01) | |
| *G06T 19/20* | (2011.01) | |
| *G06T 13/20* | (2011.01) | |

(52) U.S. Cl.
CPC ...... *G06F 3/04815* (2013.01); *G06F 3/04845* (2013.01); *G06T 13/20* (2013.01); *G06T 19/006* (2013.01); *G06T 19/20* (2013.01); *G06T 2219/2004* (2013.01)

(58) Field of Classification Search
CPC . G06F 3/04815; G06F 3/04845; G06T 13/20; G06T 19/006; G06T 19/20; G06T 2219/2004; G06T 19/0006
See application file for complete search history.

(56) References Cited

U.S. PATENT DOCUMENTS

| | | | | |
|---|---|---|---|---|
| 2005/0231512 | A1* | 10/2005 | Niles | G06T 13/00 345/473 |
| 2015/0373281 | A1* | 12/2015 | White | G11B 27/34 348/660 |
| 2015/0379011 | A1* | 12/2015 | Neyyan | G06F 16/489 345/581 |
| 2016/0004773 | A1* | 1/2016 | Jannink | G06F 16/60 707/741 |
| 2017/0091977 | A1* | 3/2017 | West | G06F 3/04883 |
| 2017/0294041 | A1* | 10/2017 | Kaufman | G06F 3/04845 |
| 2020/0005532 | A1* | 1/2020 | Kovar | G06T 13/20 |

* cited by examiner

*Primary Examiner* — Mong-Shune Chung
(74) *Attorney, Agent, or Firm* — Fernando & Partners, LLP

(57) ABSTRACT

In one implementation, a method of manipulating animation timing is provided by a device including one or more processors coupled to non-transitory memory. The method includes displaying, using a display, a timeline for an animation of an object moving along a path, wherein the timeline includes a plurality of ticks, wherein each of the plurality of ticks is associated with a respective distance along the timeline and a respective distance along the path, wherein the respective distance along the timeline is proportional to an amount of time for the object to move the respective distance along the path. The method includes receiving, using one or more input devices, an input within the timeline. The method includes, in response to receiving the input within the timeline, changing the respective distances along the timeline of two or more of the plurality of ticks.

20 Claims, 36 Drawing Sheets

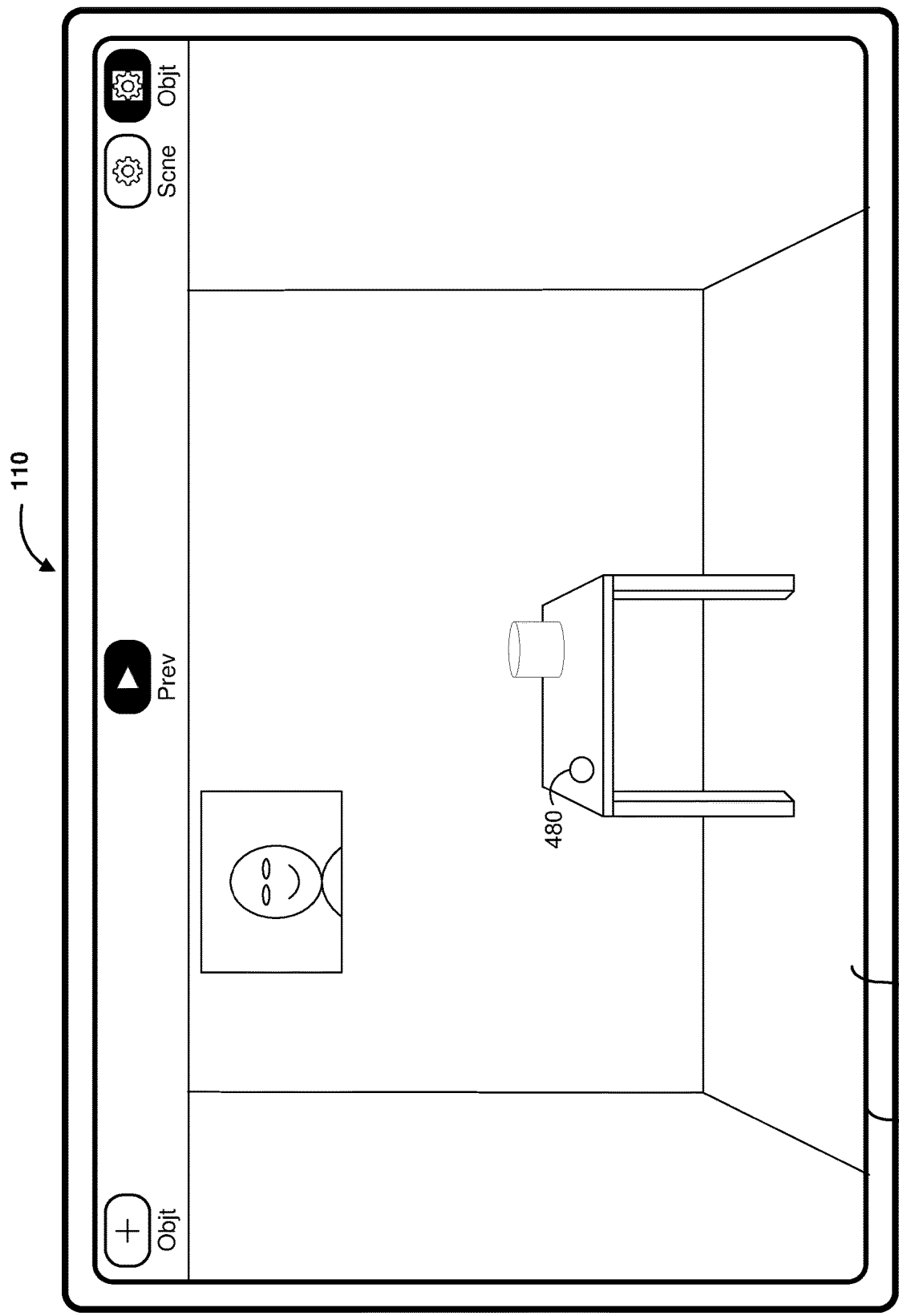
Figure 4C1

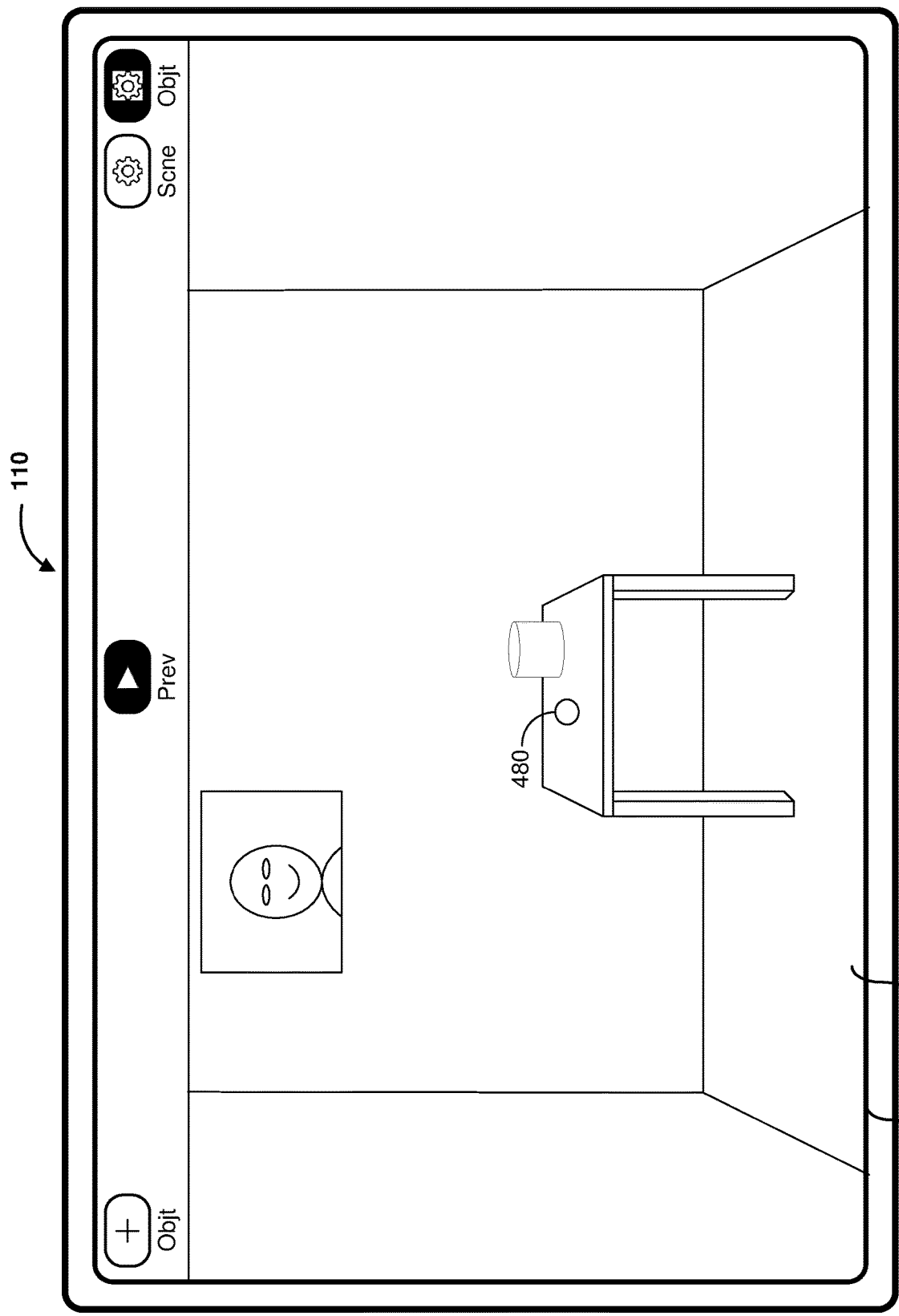
Figure 4C2

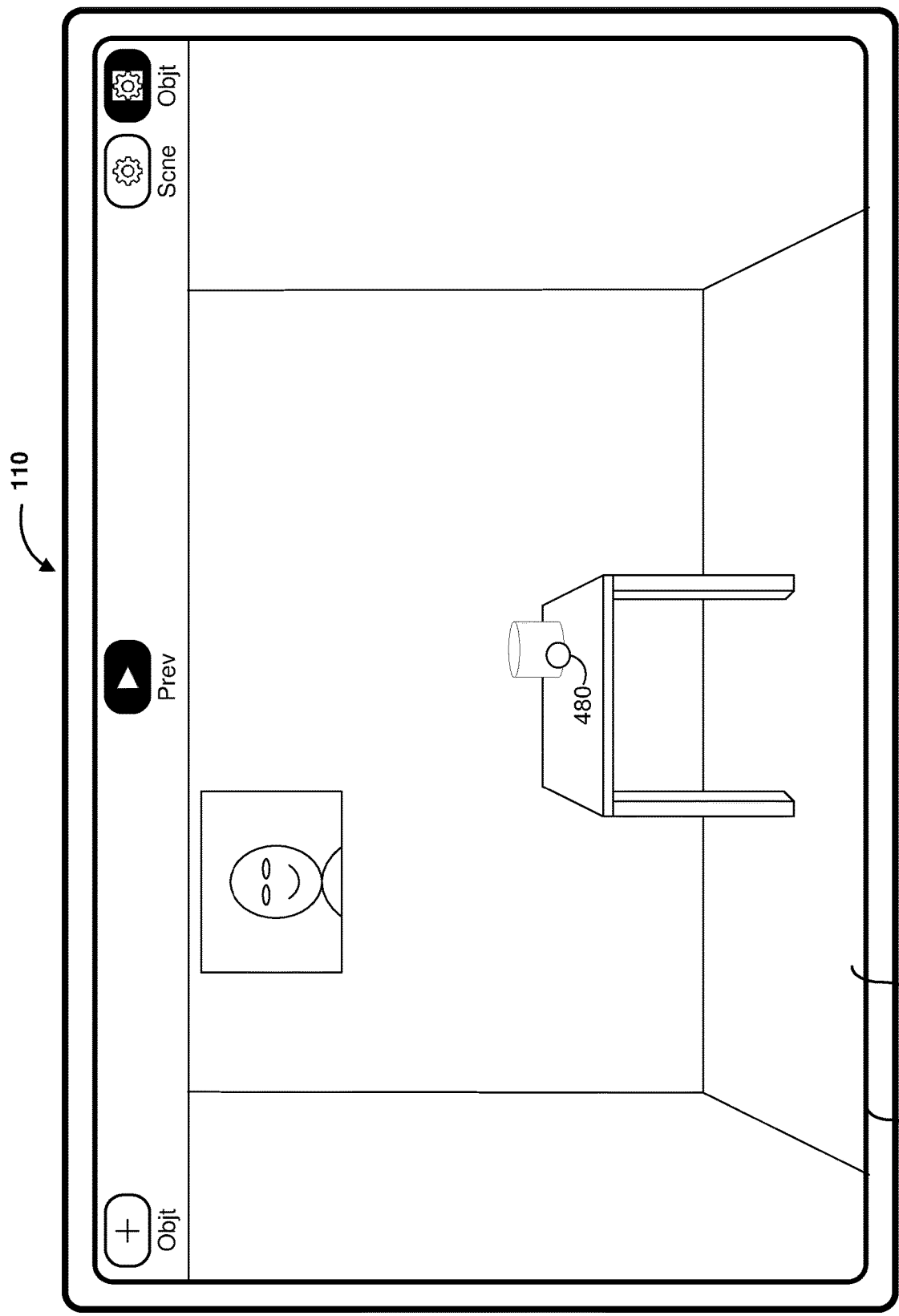
Figure 4C3

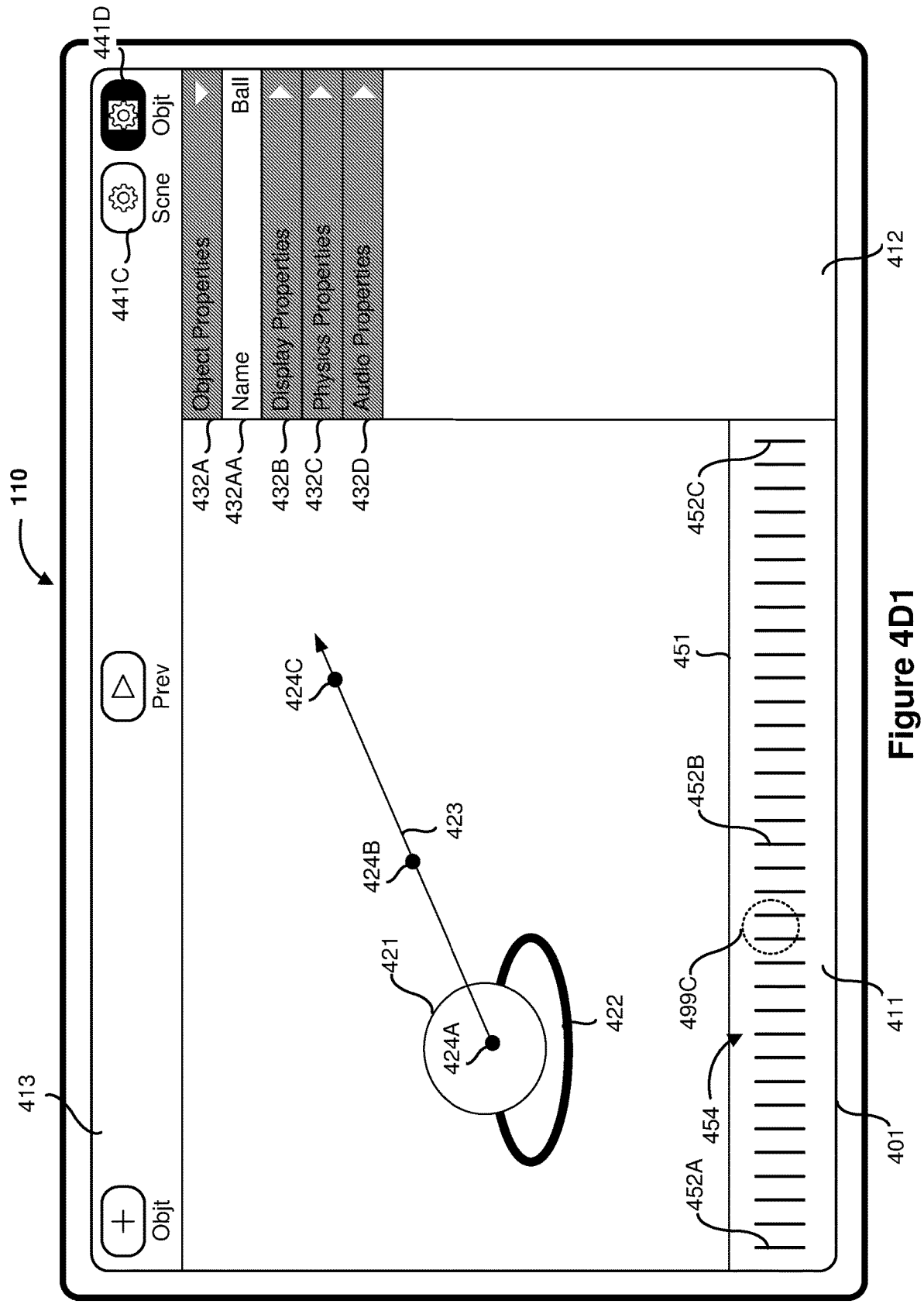
Figure 4D1

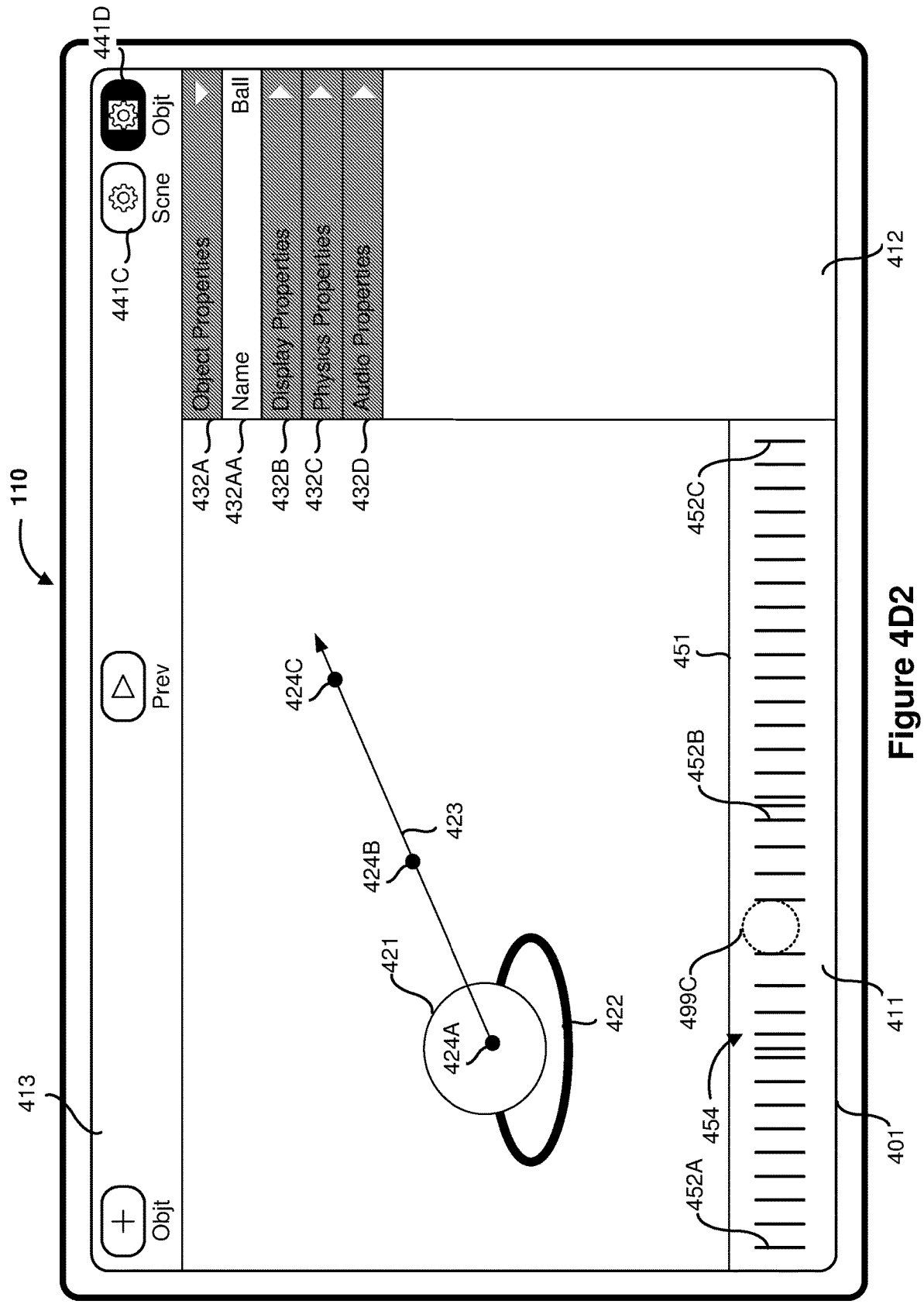
Figure 4D2

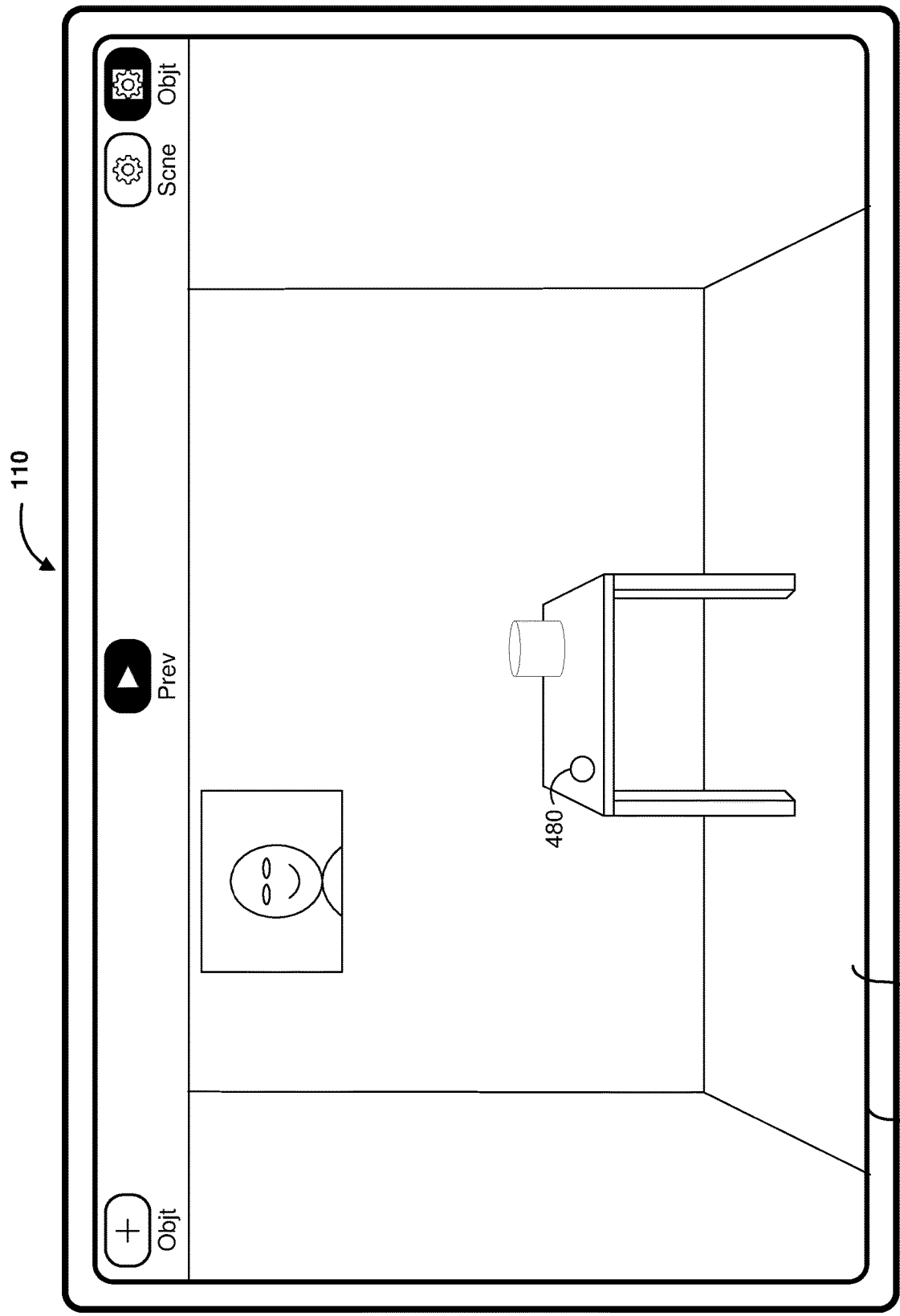
Figure 4F1

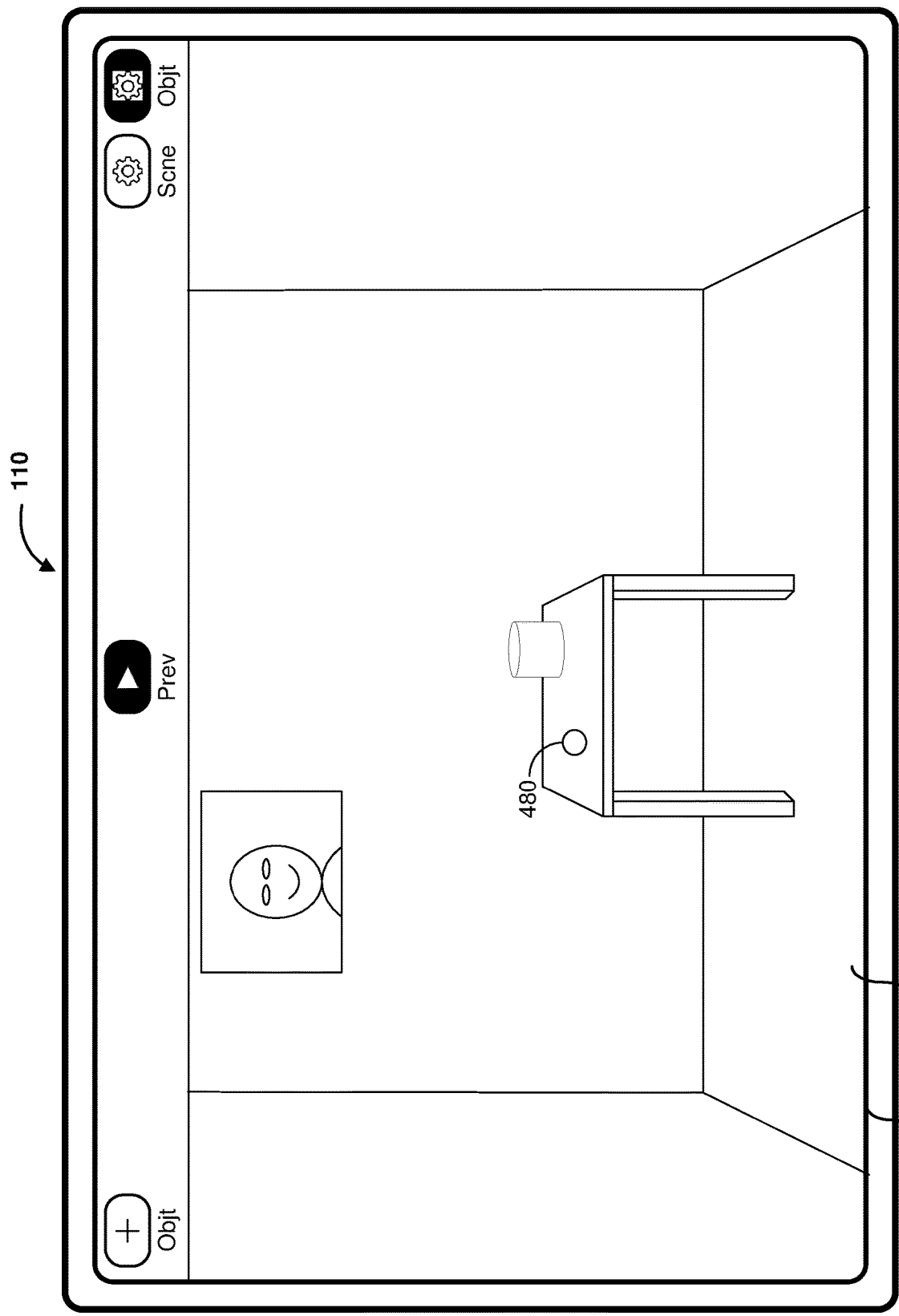
Figure 4F2

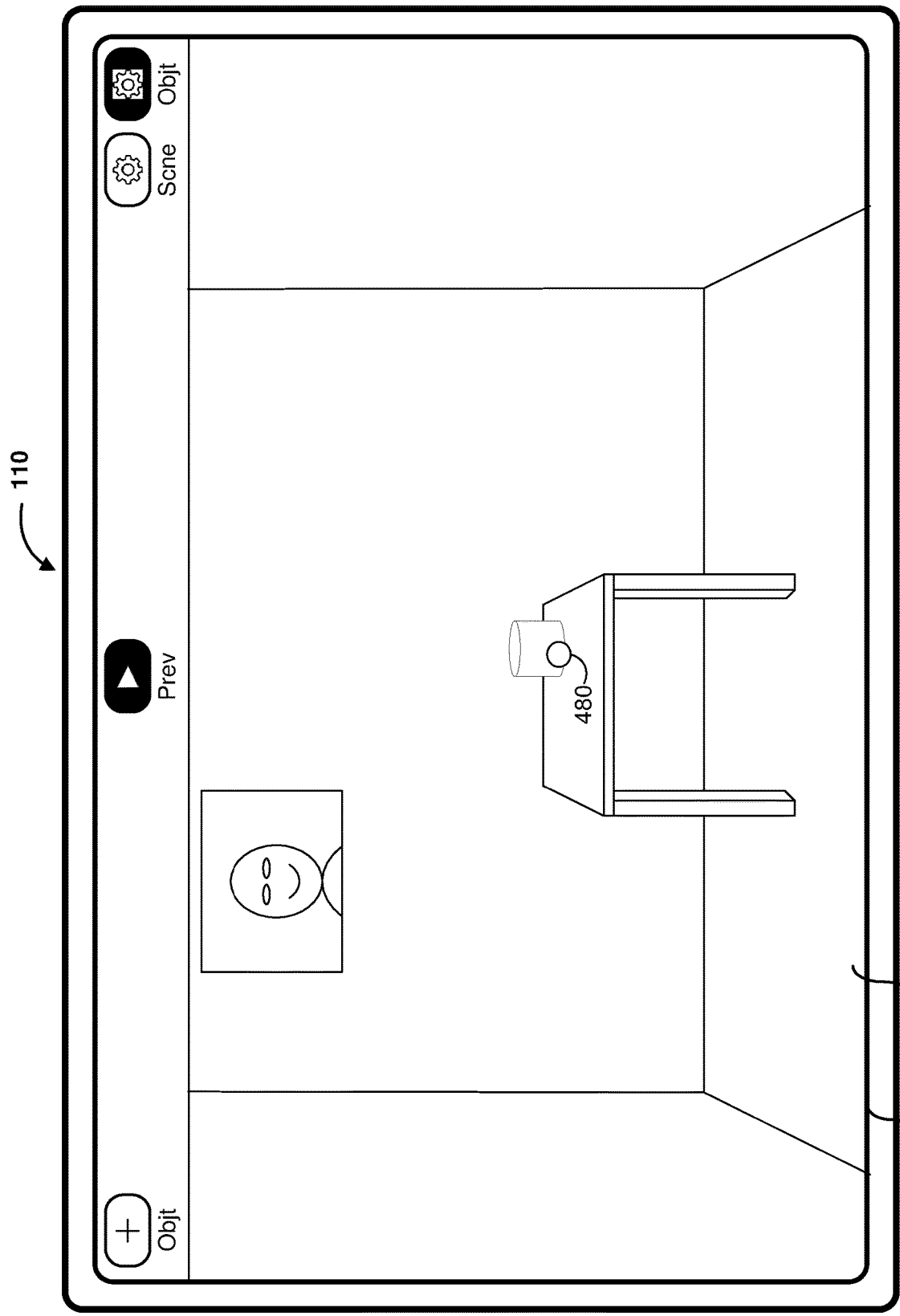
Figure 4F3

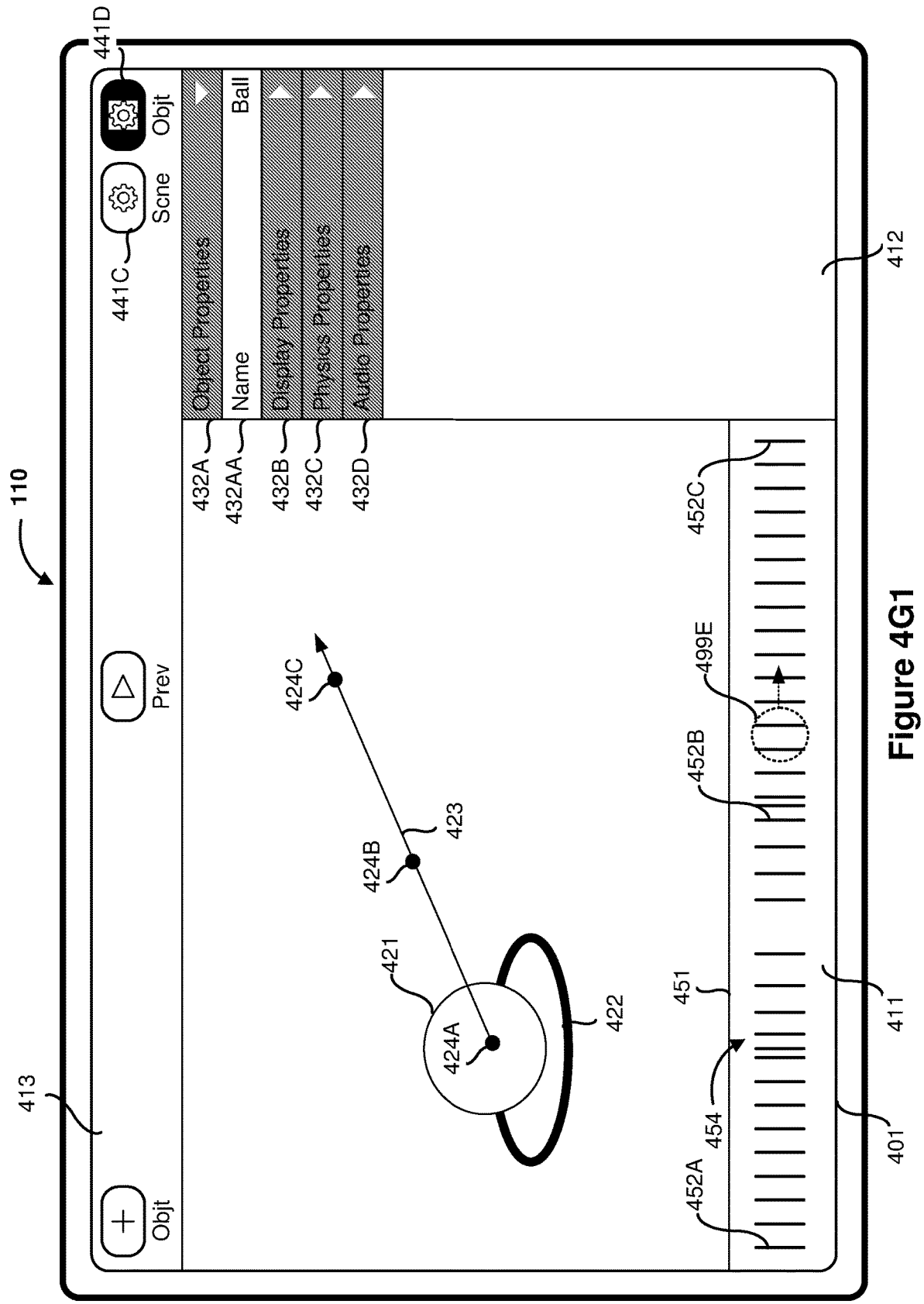
Figure 4G1

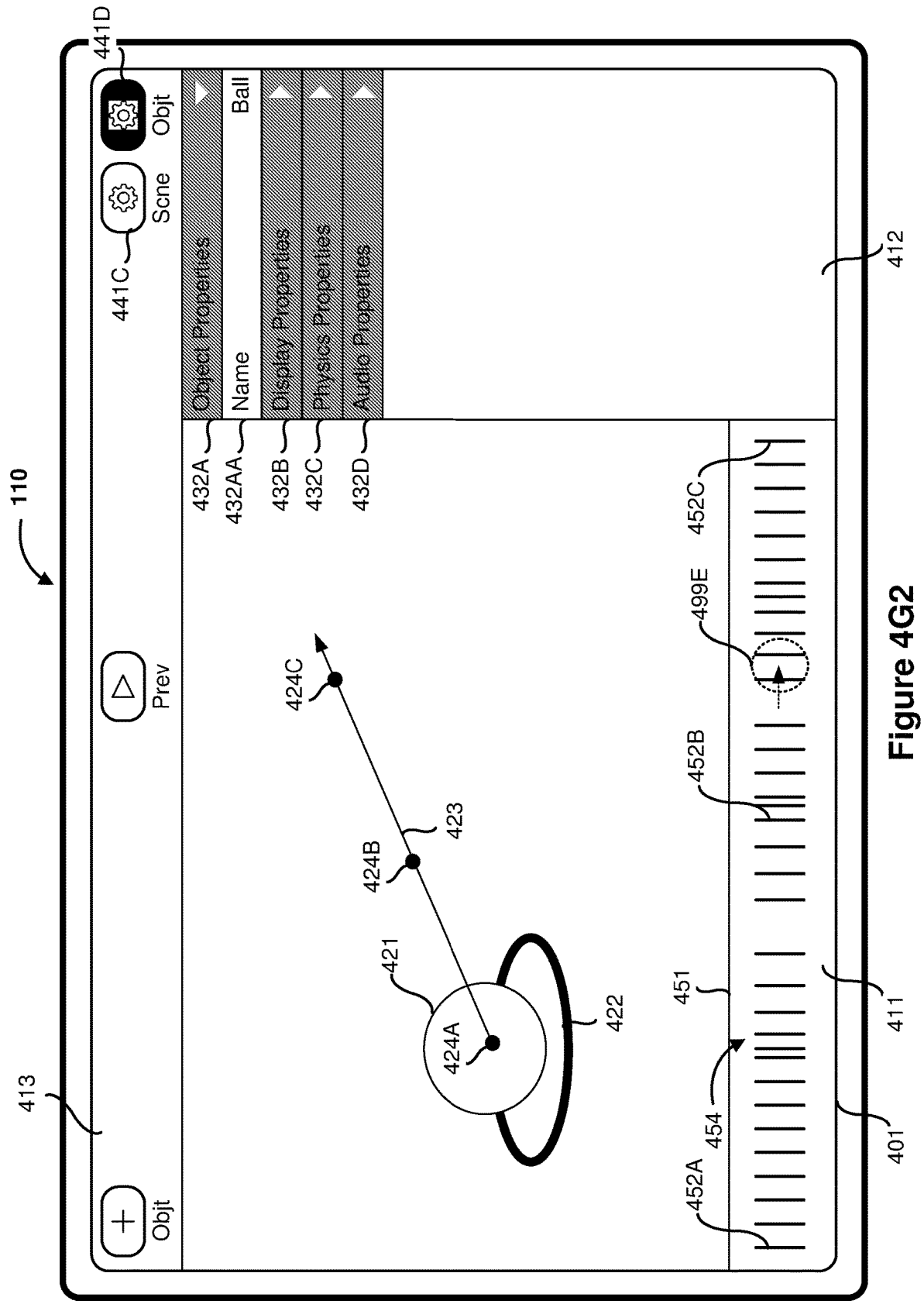
Figure 4G2

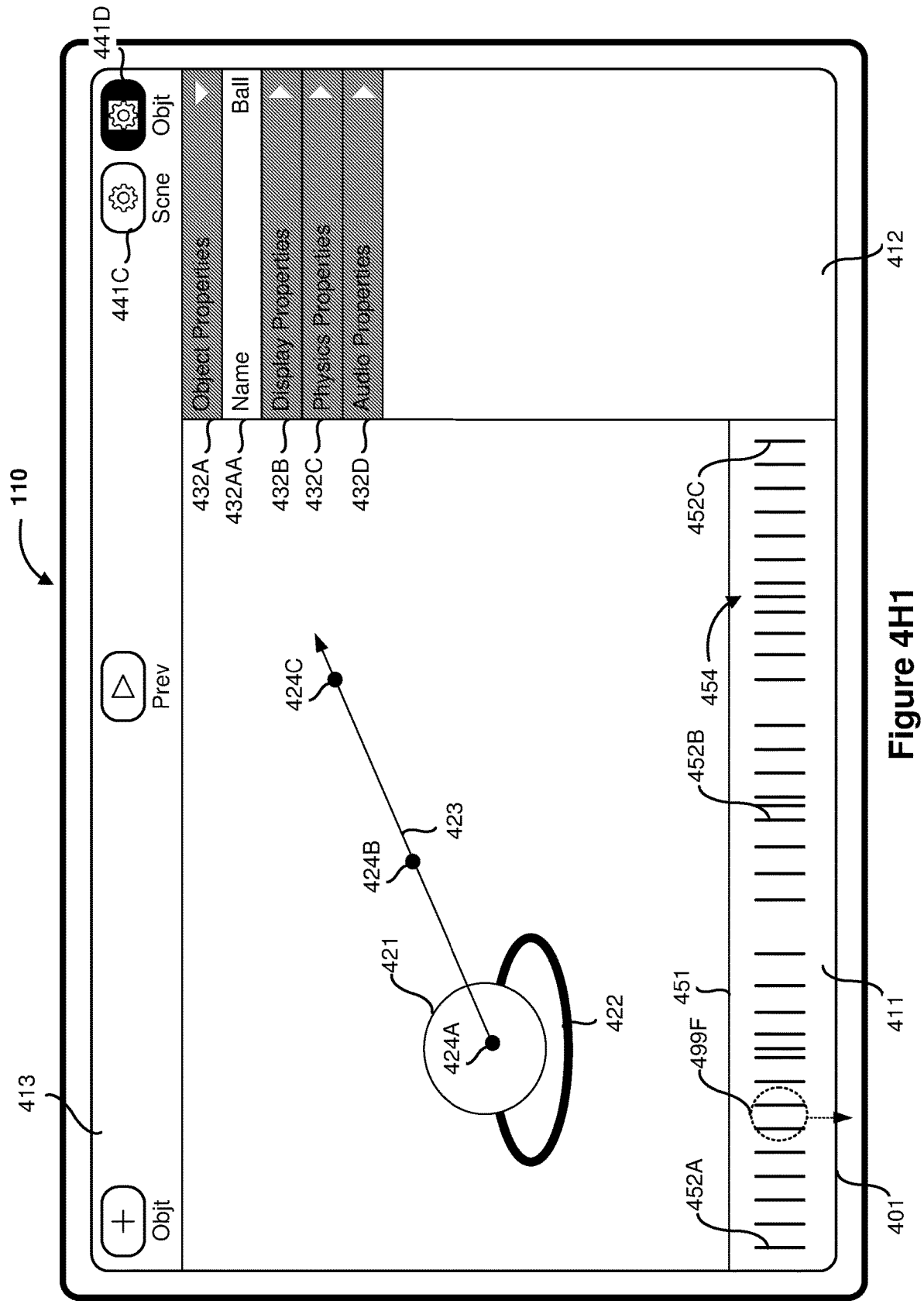
Figure 4H1

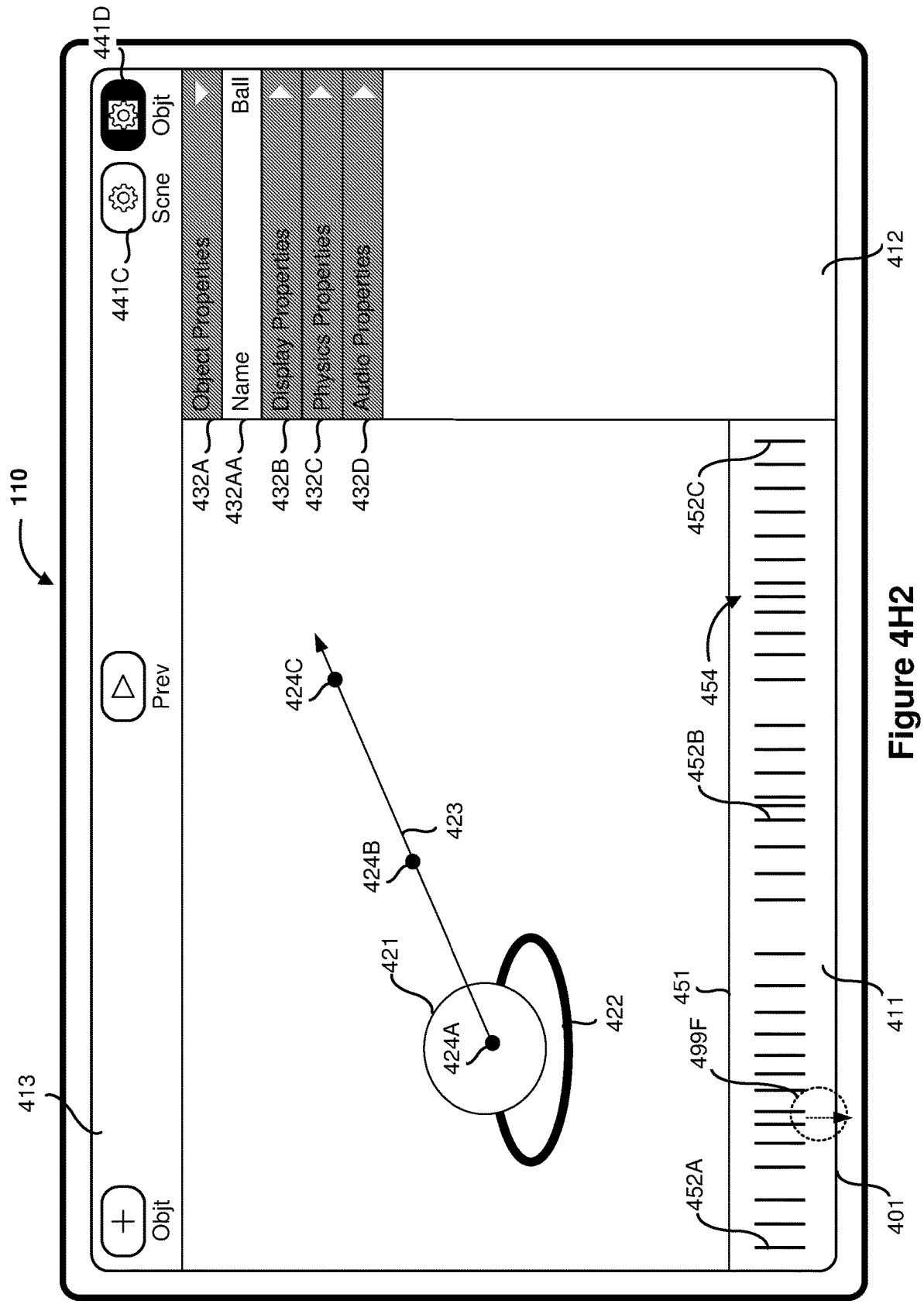
Figure 4H2

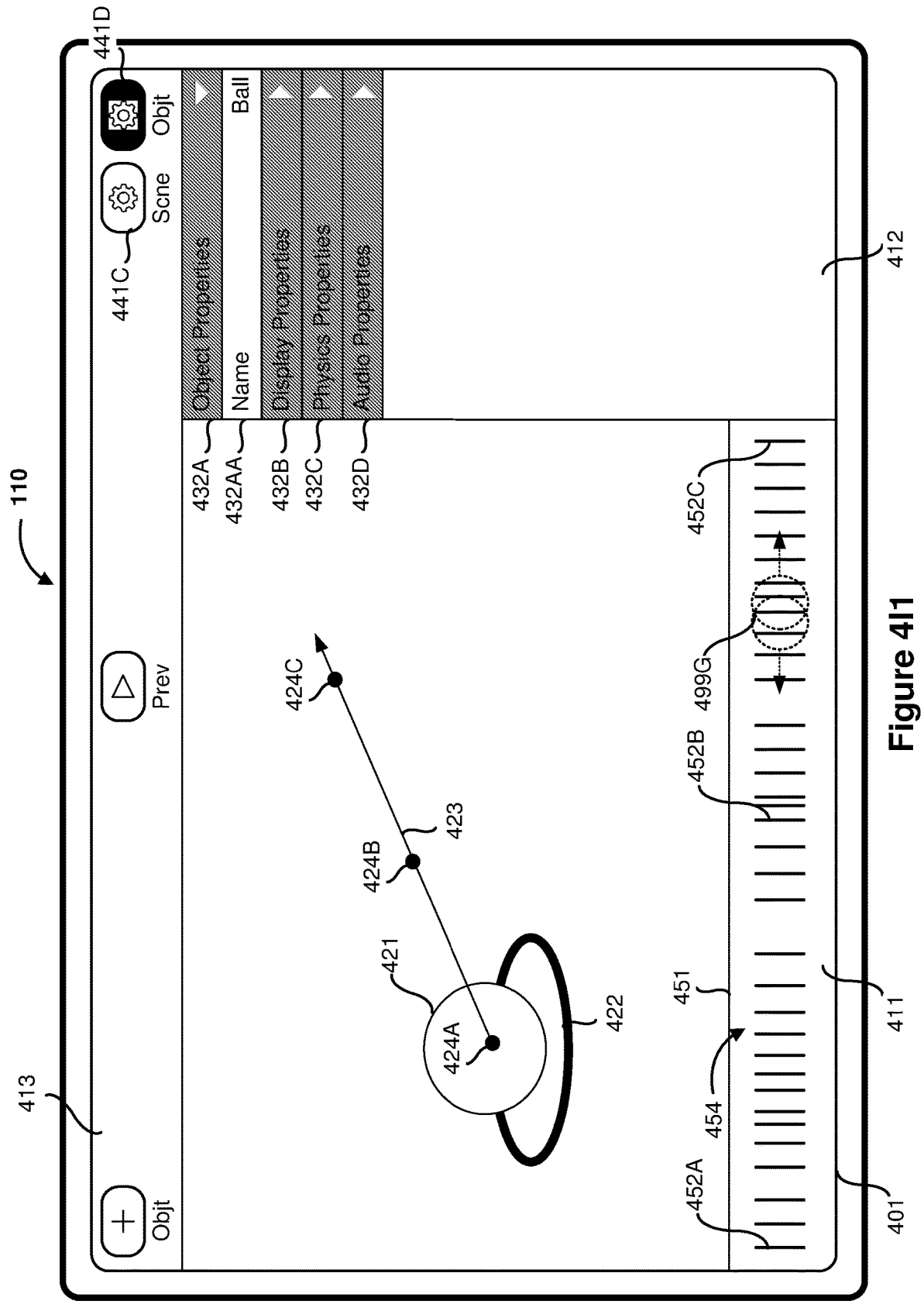
Figure 4I1

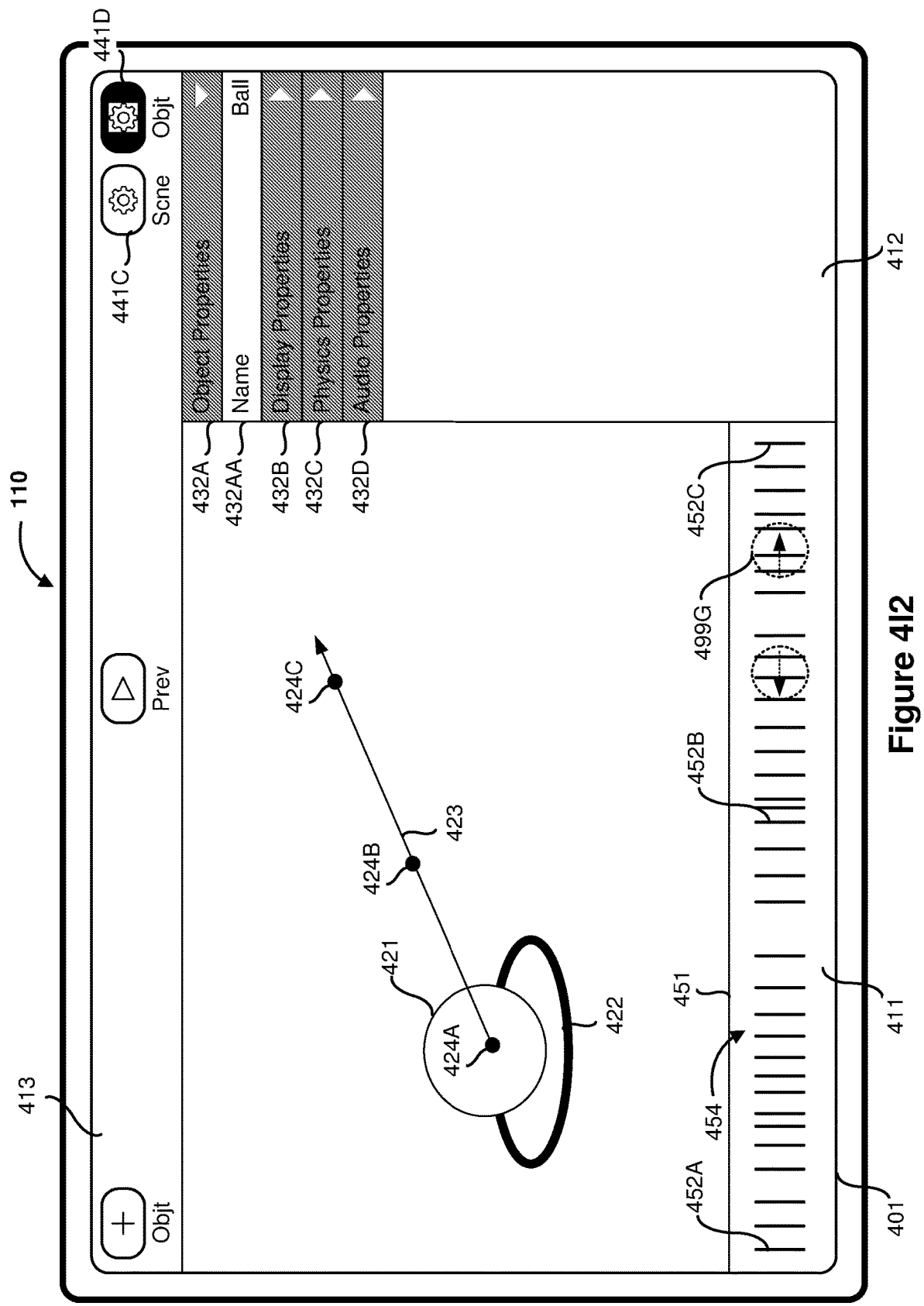
Figure 4I2

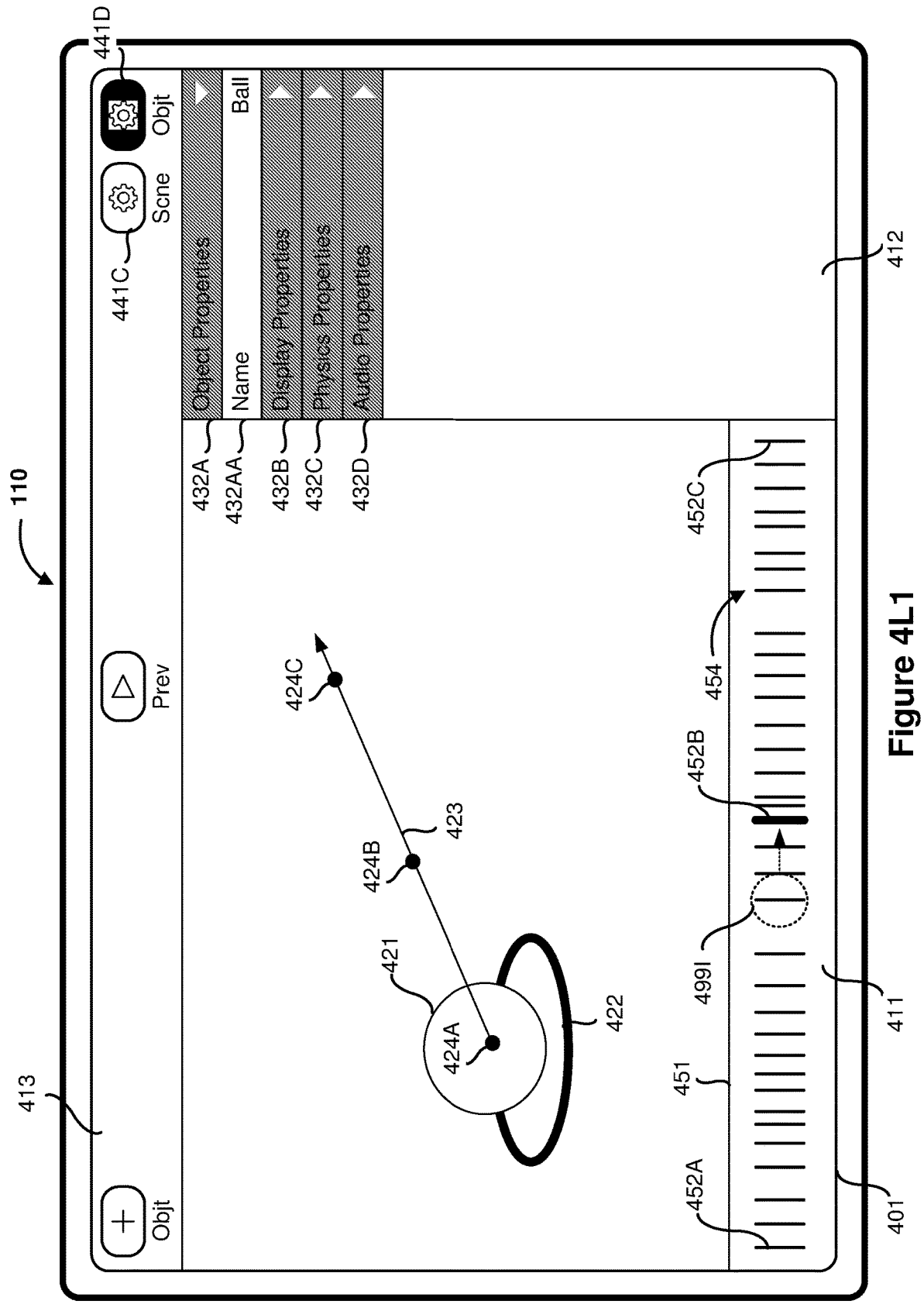
Figure 4L1

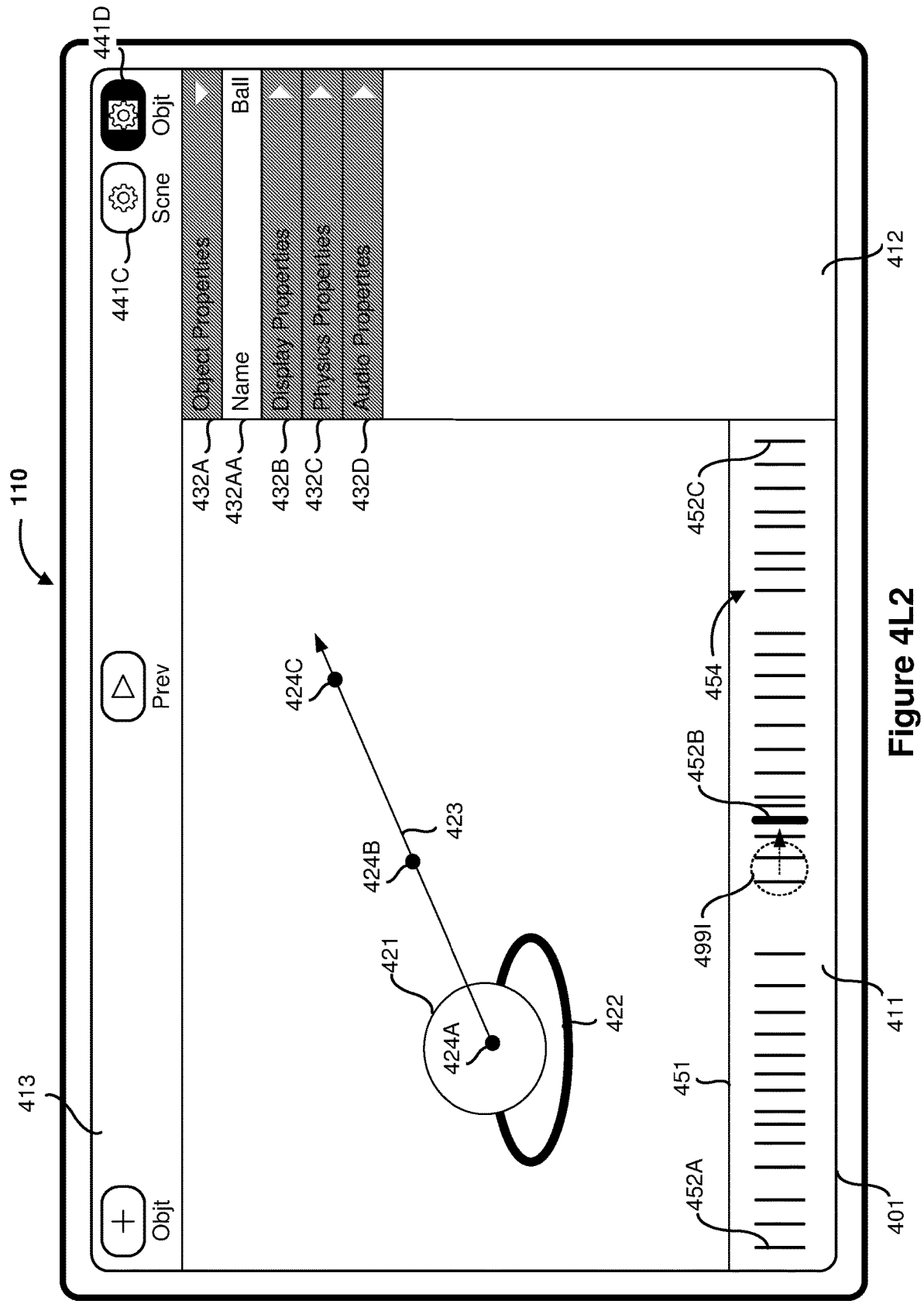
Figure 4L2

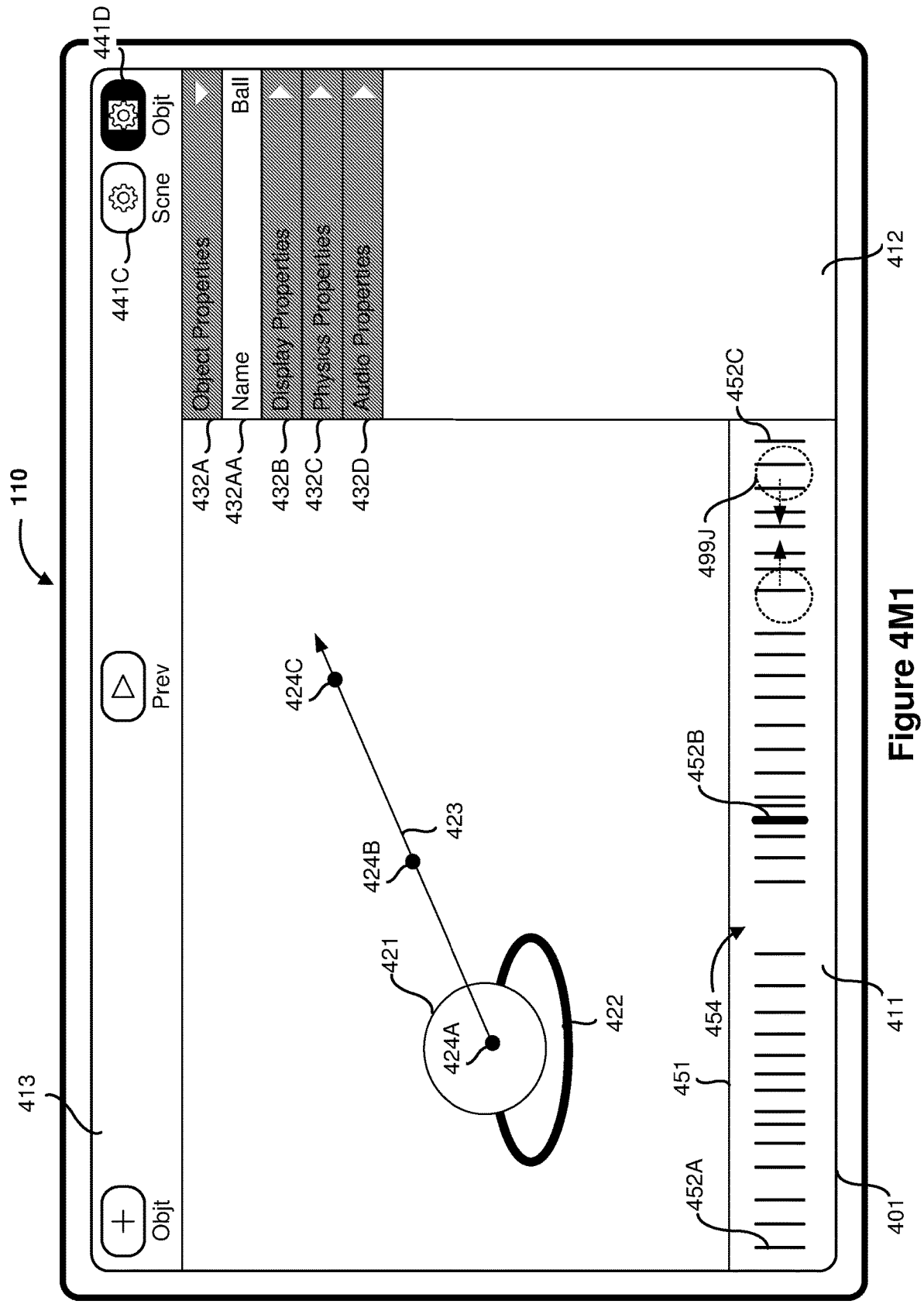
Figure 4M1

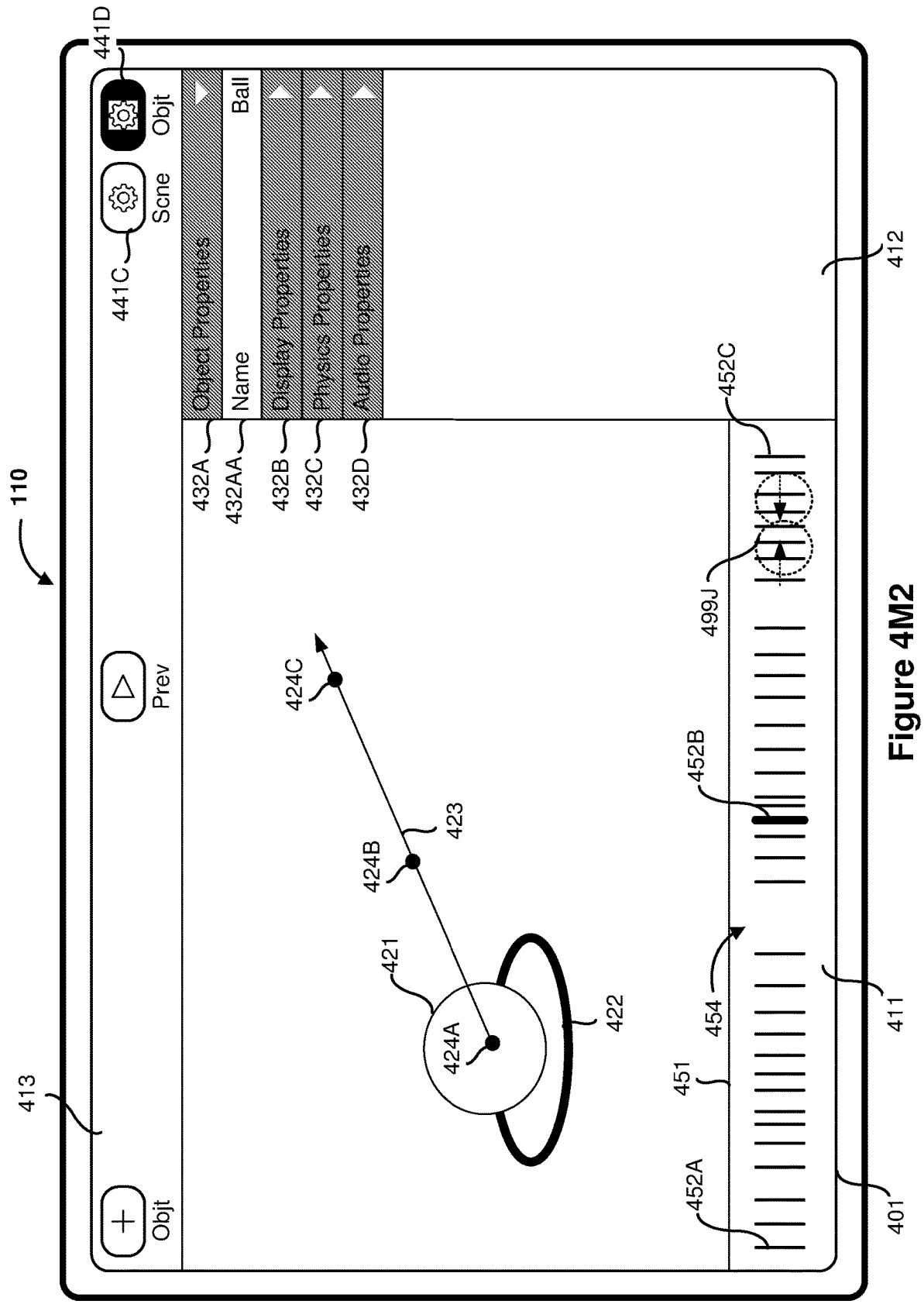
Figure 4M2

500

At a device including one or more processors coupled to non-transitory memory:

Displaying, using a display, a timeline for an animation of an object moving along a path, wherein the timeline includes a plurality of ticks, wherein each of the plurality of ticks is associated with a respective distance along the timeline and a respective distance along the path, wherein the respective distance along the timeline is proportional to an amount of time for the object to move the respective distance along the path ⎯510

Receiving, using one or more input devices, an input within the timeline ⎯520

In response to receiving the input within the timeline, changing the respective distances along the timeline of two or more of the plurality of ticks ⎯530

Figure 5

MANIPULATION OF ANIMATION TIMING

CROSS-REFERENCE TO RELATED APPLICATIONS

This application claims priority to U.S. Provisional Patent App. No. 63/063,789, filed on Aug. 10, 2020, which is hereby incorporated by reference herein in its entirety.

TECHNICAL FIELD

The present disclosure generally relates to manipulating the timing of an animation.

BACKGROUND

In various implementations, extended reality (XR) environments include objects that move along a path. However, user interfaces for manipulating the speed at which the object traverses the path and in particular, the speed of the object at various positions along the path, can be counter-intuitive resulting in such manipulation being difficult and time-consuming.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 5 is a flowchart representation of a method of manipulating animation timing in accordance with some implementations.

Figure 1:
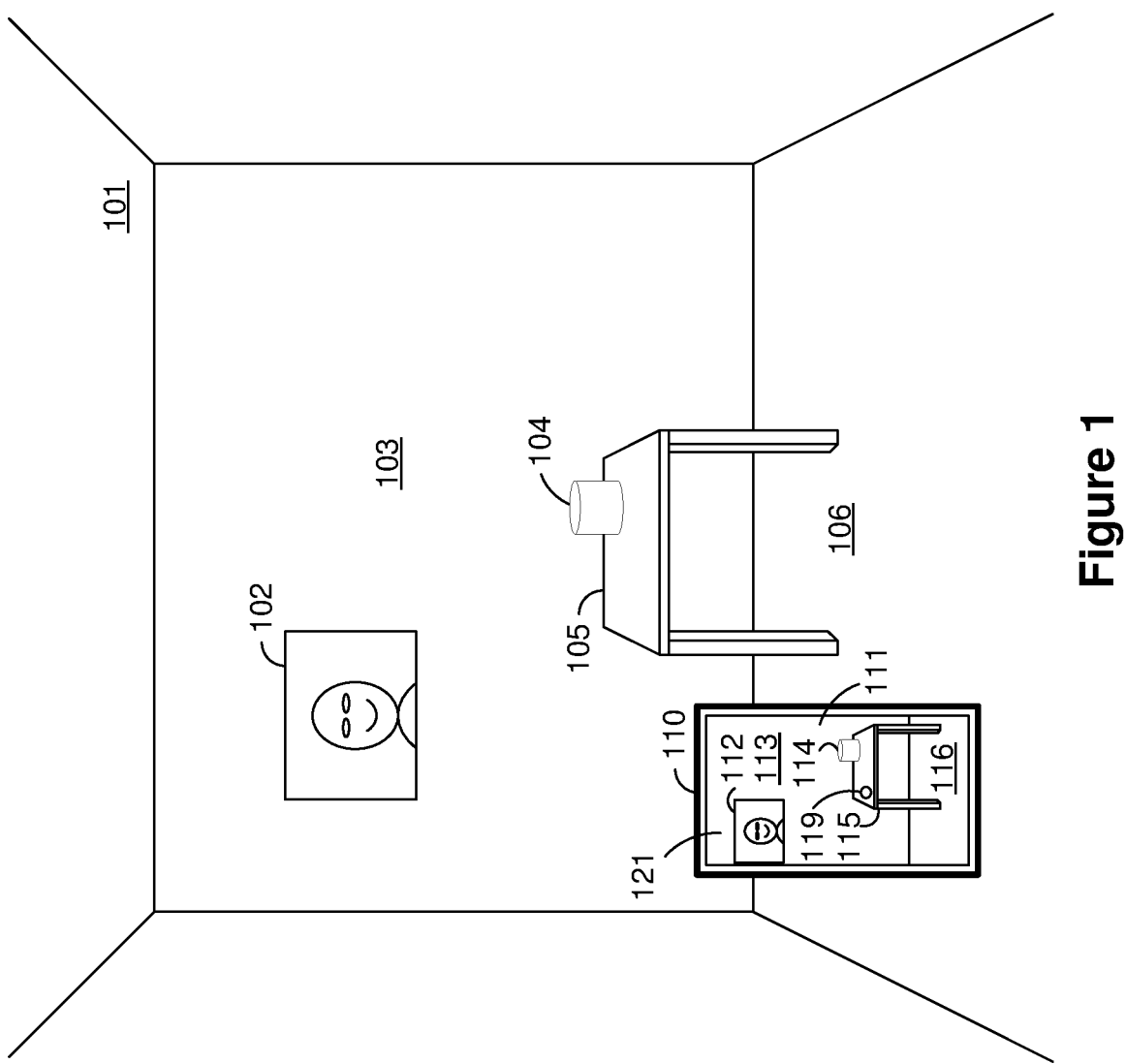
FIG. 1 illustrates a physical environment with an electronic device surveying the physical environment.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for manipulating animation timing. In various implementations, a method is performed at a device including one or more processors coupled to non-transitory memory. The method includes displaying, using a display, a timeline for an animation of an object moving along a path, wherein the timeline includes a plurality of ticks, wherein each of the plurality of ticks is associated with a respective distance along the timeline and a respective distance along the path, wherein the respective distance along the timeline is proportional to an amount of time for the object to move the respective distance along the path. The method includes receiving, using one or more input devices, an input within the timeline. The method includes in response to receiving the input within the timeline, changing the respective distances along the timeline of two or more of the plurality of ticks.

In accordance with some implementations, a device includes one or more processors, a non-transitory memory, and one or more programs; the one or more programs are stored in the non-transitory memory and configured to be executed by the one or more processors. The one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

DESCRIPTION

A physical environment refers to a physical place that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As an example, the XR system may detect movement of the electronic device presenting the XR environment (e.g., a mobile phone, a tablet, a laptop, a head-mounted device, and/or the like) and, in response, adjust graphical content and an acoustic field presented by the electronic device to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head-mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mountable system may have one or more speaker(s) and an integrated opaque display. Alternatively, a head-mountable system may be configured to accept an external opaque display (e.g., a smartphone). The head-mountable system may incorporate one or more imaging sensors to capture images or video of the physical environment, and/or one or more microphones to capture audio of the physical environment. Rather than an opaque display, a head-mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light sources, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

In various implementations, an XR environment includes an object, such as a virtual object, that moves along a path. In particular, the object moves from a start location, through a number of middle locations, to an end location. The object moves along the path with a speed that may be different at different locations. Described herein are user interfaces for manipulating the speed (or speeds) at which the object moves along the path.

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

FIG. 1 illustrates a physical environment 101 with an electronic device 110 surveying the physical environment 101. The physical environment 101 includes a picture 102 hanging on a wall 103, a table 105 on a floor 106, and a cylinder 104 on the table 105.

The electronic device 110 displays, on a display, an image of an extended reality (XR) environment 121 which includes a representation of the physical environment 111 and a representation of a virtual object 119. In various implementations, the representation of the physical environment 111 is generated based on an image of the physical environment 101 captured with one or more cameras of the electronic device 110 having a field-of-view directed toward the physical environment 101. Suitable cameras include scene cameras, event cameras, depth cameras, and so forth. Accordingly, the representation of the physical environment 111 includes a representation of the picture 112 hanging on a representation of the wall 113, a representation of the table 115 on a representation of the floor 116, and a representation of the cylinder 114 on the representation of the table 115.

In addition to the representations of real objects of the physical environment 101, the image of the XR environment 121 includes a representation of the virtual object 119. The visual appearance of the virtual object 119 is defined by software on the electronic device 110. The electronic device 110 presents the virtual object 119 as resting on the top surface of the representation of the table 115 by accounting for the position and orientation of device 110 relative to table 105.

Figures 2A, 2B, 2C:
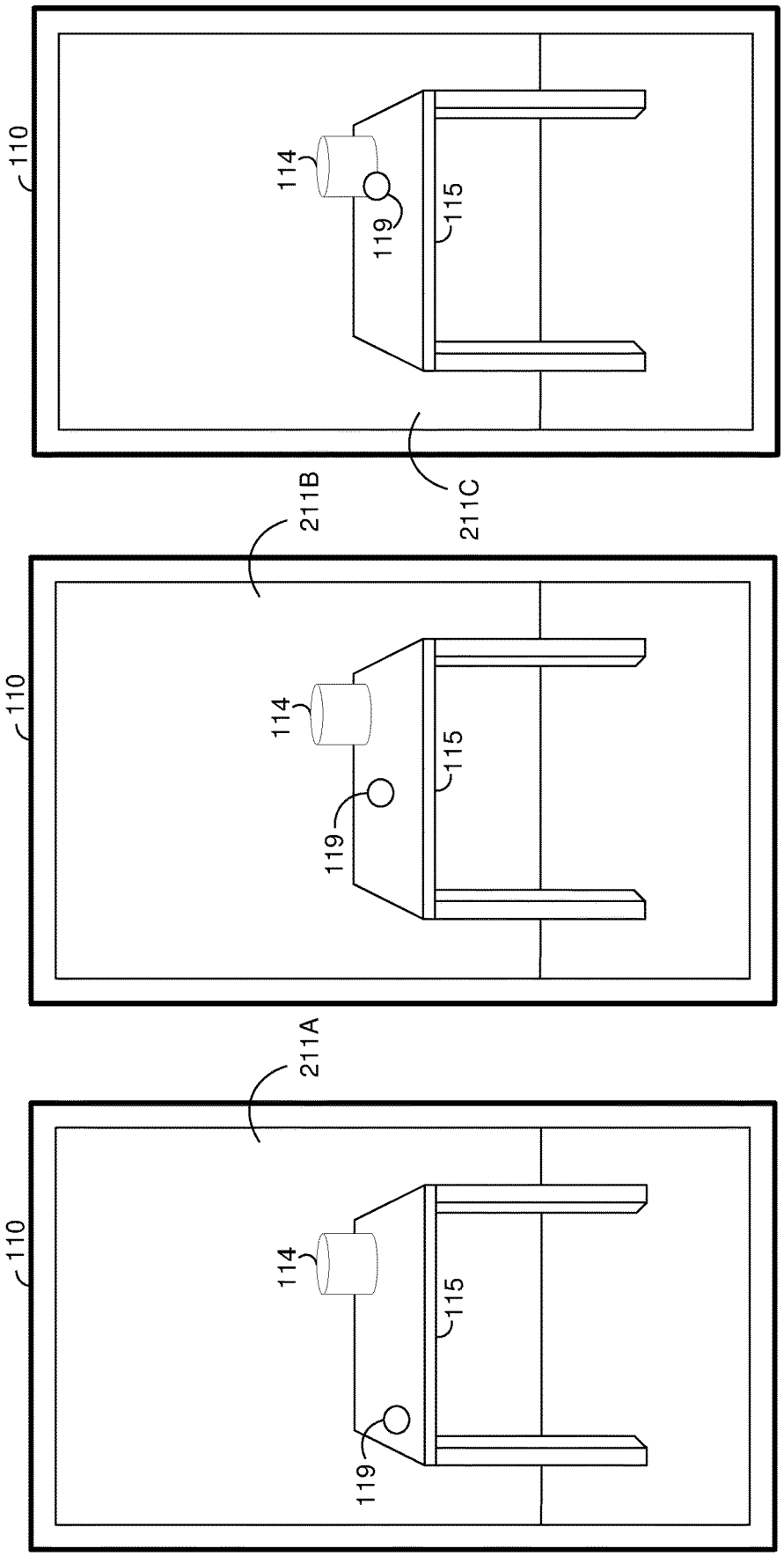
FIGS. 2A-2C illustrate the electronic device of FIG. 1 displaying an animation of the virtual object moving along a path according to a first speed profile.

FIGS. 2A-2C illustrate the electronic device 110 displaying an animation of the virtual object 119 moving along a path according to a first speed profile. FIG. 2A illustrates the electronic device 110 displaying, at a first time, a first image 211A of the animation. In the first image 211A, the virtual object 119 is displayed at a first location on the representation of the table 115. FIG. 2B illustrates the electronic device 110 displaying, at a second time, a second image 211B of the animation. In the second image 211B, the virtual object 119 is displayed at a second location on the representation of the table 115. FIG. 2C illustrates the electronic device 110 displaying, at a third time, a third image 211C of the animation. In the third image 211C, the virtual object is displayed at a third location on the representation of the table 115.

According to the first speed profile, the virtual object 119 moves at a uniform speed between the first location and the third location. Thus, when the second time is halfway between the first time and the third time, the second location is halfway along the path between the first location and the third location. It is to be appreciated that when the path is non-linear the second location may not be linearly halfway between the first location and the second location.

Figures 3A, 3B, 3C:
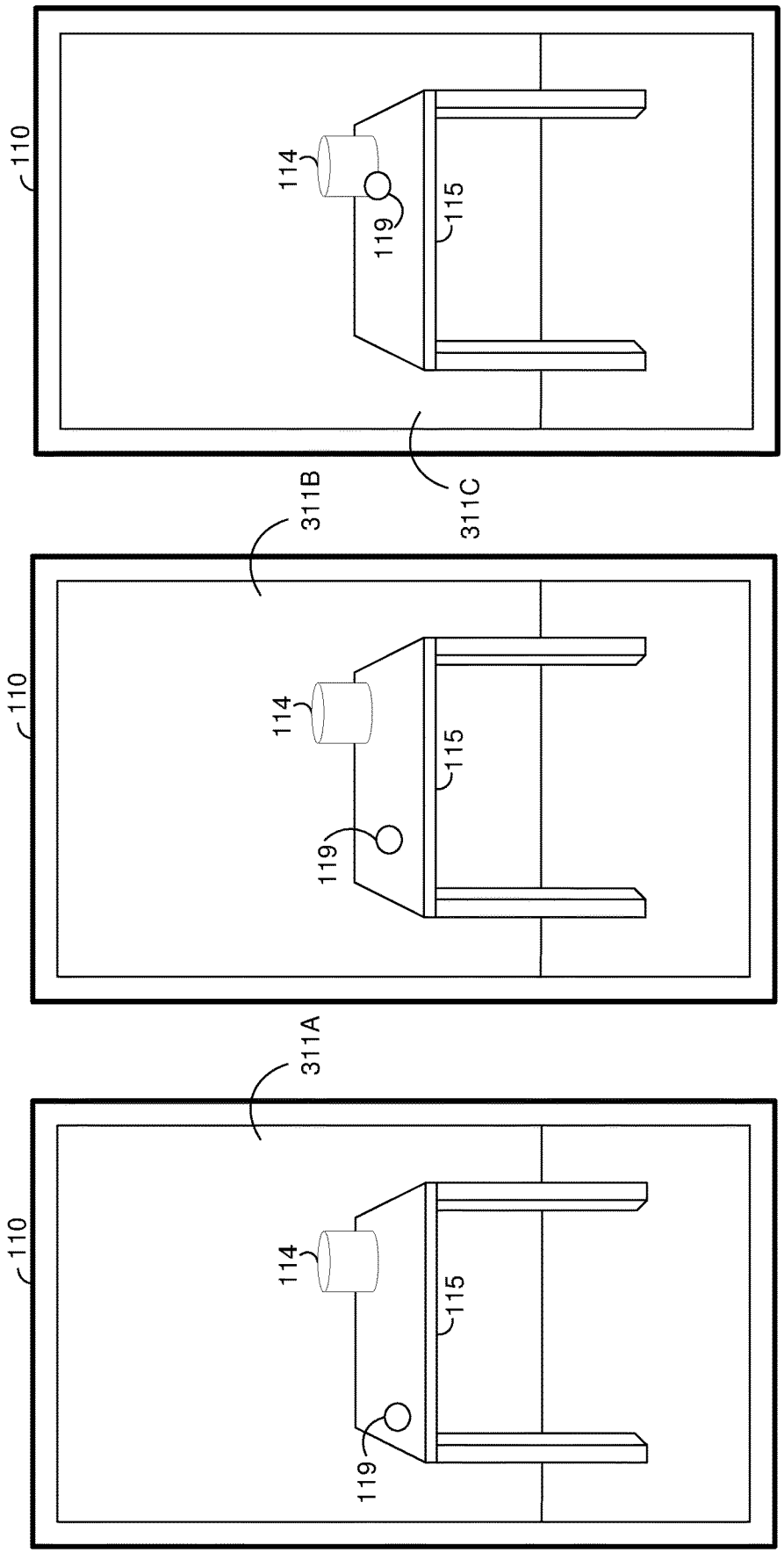
FIGS. 3A-3C illustrate the electronic device of FIG. 1 displaying an animation of the virtual object moving along the path according to a second speed profile.

FIGS. 3A-3C illustrate the electronic device 110 displaying an animation of the virtual object 119 moving along the path according to a second speed profile. FIG. 3A illustrates the electronic device 110 displaying, at a first time, a first image 311A of the animation. In the first image 311A, the virtual object 119 is displayed at a first location on the representation of the table 115. FIG. 3B illustrates the electronic device 110 displaying, at a second time, a second image 311B of the animation. In the second image 311B, the virtual object 119 is displayed at a second location on the representation of the table 115. FIG. 3C illustrates the electronic device 110 displaying, at a third time, a third image 311C of the animation. In the third image 311C, the virtual object is displayed at a third location on the representation of the table 115.

According to the second speed profile, the virtual object 119 accelerates from the first location to the third location.

In particular, the speed of the virtual object 119 at the first time is a first value, the speed of the virtual object 119 at the second time is a second value greater than the first value, and the speed of the virtual object 119 at the third time is a third value greater than the second value. Thus, when the second time is halfway between the first time and the third time, the second location is not halfway along the path, but closer to the first location than the halfway point. Thus, in comparing FIG. 3B to FIG. 2B, the location of the virtual object 119 in FIG. 3B is closer to the first location than the location of the virtual object 119 in FIG. 2B.

Figure 4A:
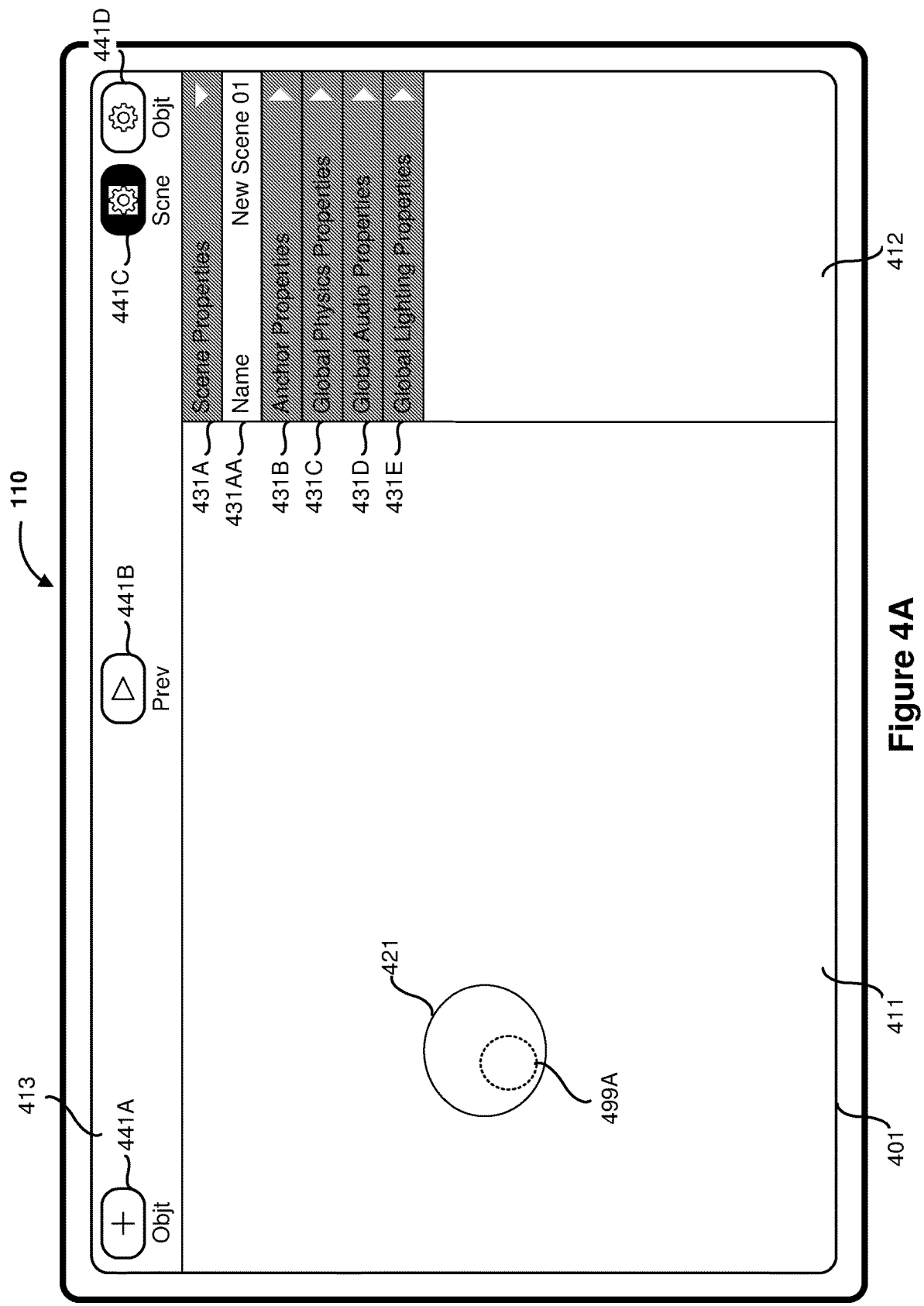
FIGS. 4A-4O illustrate the electronic device of FIG. 1 displaying a graphical user interface (GUI) for manipulating animation timing.

FIG. 4A illustrates the electronic device 110 displaying a graphical user interface (GUI) 401 for composing an extended reality (XR) scene. In particular, the GUI 401 includes a representation of the XR scene. In various implementations, an application of the electronic device 110 or a different electronic device executes to present the XR scene in an XR environment, such as a virtual environment or in association with a representation of a physical environment.

The GUI 401 includes exemplary view region 411, settings region 412, and toolbar region 413. The exemplary view region 411 includes a representation of the XR scene. In various implementations, the XR scene includes a virtual ball. Accordingly, in FIG. 4A, the representation of the XR scene in the view region 411 includes a representation of the virtual ball 421.

Figure 4B:
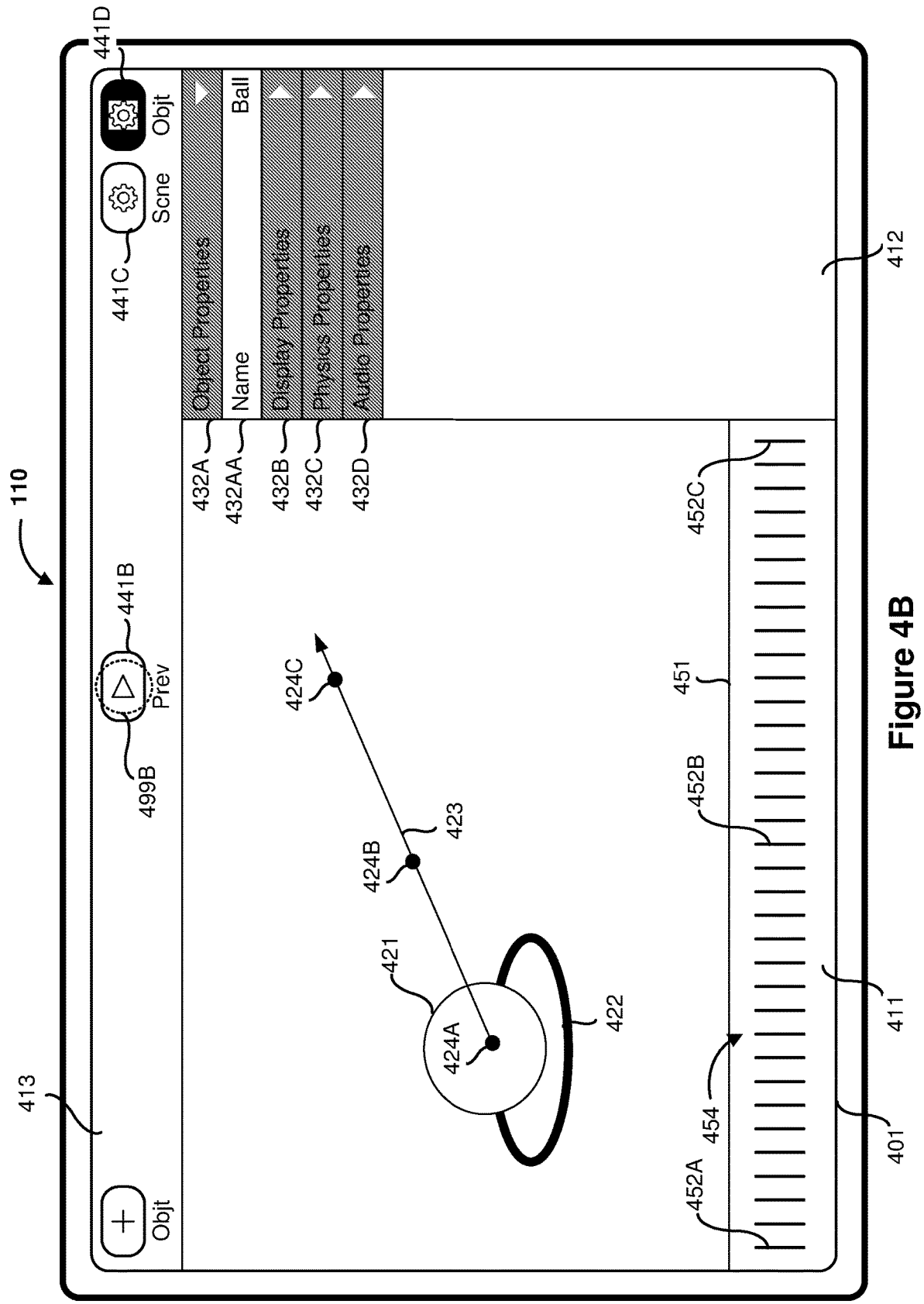

The exemplary settings region 412 includes, as illustrated in FIG. 4A, a plurality of scene settings manipulation affordances or, as illustrated in FIG. 4B, a plurality of object settings manipulation affordances depending on whether the scene settings affordance 441C in the toolbar region 413 or the object settings affordance 441D in the toolbar region 413 is selected. In FIG. 4A, the different display of the scene settings affordance 441C as compared to the object settings affordance 441D and other affordances of the toolbar region 413 indicates that the scene settings affordance 441C is selected. Accordingly, the exemplary settings region 412 includes a number of scene settings manipulation affordances presented via collapsible and expandable scene setting menus 431A-431E. In FIG. 4A, an exemplary scene setting manipulation affordance, the scene name manipulation affordance 431AA for changing a name of the XR scene is shown.

The scene settings menus 431A-431E include a scene properties menu 431A including scene settings manipulation affordances for changing scene properties of the XR scene such as a name of the XR scene, an anchor properties menu 431B including scene setting manipulation affordances for changing anchor properties of the XR scene such as whether the XR scene is displayed on a detected horizontal surface, detected vertical surface, or detected object, a global physics properties menu 431C including scene setting manipulation affordances for changing physics properties of the XR scene such as whether objects of the XR scene interact and/or a presence and/or strength of gravity, a global audio properties menu 431D including scene setting manipulation affordances for changing audio properties of the XR scene such as a sound to be played while the XR scene is presented, e.g., a soundtrack, or audio effects to be applied to real sounds detected while the XR scene is presented, e.g., a reverb or an attenuation, and a global lighting properties menu 431E for changing lighting properties of the XR scene such as a directional or omnidirectional light to be rendered when the XR scene is presented or how real light affects display of XR objects of the XR scene. In various implementations, the exemplary settings region 412 includes additional and/or fewer scene settings menus and/or scene settings manipulation affordances.

The exemplary toolbar region 413 includes an object addition affordance 441A for adding objects to the XR scene, a preview affordance 441B for previewing the XR scene, the scene settings affordance 441C for displaying scene setting manipulation affordances in the settings region 412, and the object settings affordance 441D for displaying object setting manipulation affordances in the settings region 412. In various implementations, the toolbar region 413 includes additional and/or fewer affordances.

FIG. 4A illustrates an input 499A directed to the representation of the virtual ball 421. In various implementations, the input 499A is input by a user tapping a finger or stylus on a touch-sensitive display at the location of the representation of the virtual ball 421. In various implementations, the input 499A is input by a user clicking a mouse button while a cursor is displayed at the location of the representation of the virtual ball 421.

FIG. 4B illustrates the GUI 401 of FIG. 4A in response to detecting the input 499A directed to the representation of the virtual ball 421. In response to detecting the input 499A directed to the representation of the virtual ball 421, a selection indicator 422 is displayed in association with the representation of the virtual ball 421. In FIG. 4B, the selection indicator 422 is displayed as a ring surrounding the representation of the virtual ball 421. Further, the scene settings affordance 441C in the toolbar region 413 is deselected and the object settings affordance 441D in the toolbar region 413 is selected. Accordingly, the settings region 412 includes a plurality of object setting manipulation affordances presented via collapsible and expandable object setting menus 432A-432D. In FIG. 4B, an exemplary object setting manipulation affordance, the object name manipulation affordance 432AA for changing a name of the currently selected object is shown. Like the selection indicator 422 displayed in association with the representation of the virtual ball 421, the object name manipulation affordance 432AA displaying the name of the virtual ball (e.g., "Ball") indicates that the virtual ball is selected.

The object settings menus 432A-432D include an object properties menu 432A including object settings manipulation affordances for changing object properties of the currently selected object such as a name of the object, a display properties menu 432B including display setting manipulation affordances for changing display or rendering properties of the currently selected object such as a shape, color, or optical transmission of the object, a physics properties menu 432C including object setting manipulation affordances for changing physics properties of the currently selected object such as light reflectivity of the object or elasticity of the object, and an audio properties menu 432D including object setting manipulation affordances for changing audio properties of the currently selected object as described in detail below. In various implementations, settings region 412 includes additional and/or fewer object settings menus and/ or object settings manipulation affordances.

While the virtual ball is selected, as indicated by the selection indicator 422 being displayed in association with the representation of the virtual ball 421, a path indicator 423 is displayed indicating a path of an animation of the virtual ball. The path extends from a first location 424A to a third location 424C through a second location 424B halfway between the first location 424A and the third location 424C. Although the first location 424A, second location 424B, and third location 424C are illustrated in FIG. 4B as black dots, in various implementations, such black dots are not displayed in the GUI 401. Further, although the second location 424B is illustrated in FIG. 4B, it is to be appreciated that the path includes additional unillustrated locations between the first location 424A and the third location 424C.

In FIG. 4B, the GUI 401 includes an animation timing region 451 at the bottom of the view region 411. The animation timing region 451 includes a timeline 454 including a plurality of ticks including a first tick 452A at the beginning of the timeline 454, a second tick 452B in the middle of the timeline 454, and a third tick 452C at the end of the timeline 454.

Each of the plurality of ticks is associated with a respective distance along the timeline and a respective distance along the path, wherein the respective distance along the timeline is proportional to an amount of time for the object to move the respective distance along the path.

For example, the first tick 452A, being at the start of timeline 454, is associated with a distance along the timeline 454 of zero. Further, the first tick 452A is associated with a distance along the path of zero, corresponding to the first location 424A.

As another example, the second tick 452B, being halfway along the timeline 454, is associated with a distance along the timeline 454 of half the length of the timeline 454. Further, the second tick 452B is associated with a distance along the path of half the length of the path, corresponding to the second location 424B.

As another example, the third tick 452C, being at the end of the timeline 454, is associated with a distance along the timeline 454 of the length of the timeline 454. Further, the third tick 452B is associated with distance along the path of the length of the path, corresponding to the third location 424C.

In FIG. 4B, each of the plurality of ticks are equally spaced. Accordingly, when rendered in an XR environment, a representation of the virtual ball moves with a uniform speed along the path.

FIG. 4B illustrates an input 499B directed to the preview affordance 441B. In various implementations, the input 499B is input by a user tapping a finger or stylus on a touch-sensitive display at the location of the preview affordance 441B. In various implementations, the input 499B is input by a user clicking a mouse button while a cursor is displayed at the location of the preview affordance 441B.

FIGS. 4C1-4C3 illustrate an animation of the GUI 401 of FIG. 4B in response to detecting the input 499B directed to the preview affordance 441B. In response to detecting the input 499B directed to the preview affordance 441B, the preview affordance 441B is displayed in a different manner and the view region 411 and the settings region 412 are replaced with a preview region 414. In the preview region 414, an XR environment including the XR scene is displayed. In FIG. 4C1, a representation of the virtual ball 480 is, at a first time, displayed in the XR environment at a first location. In FIG. 4C2, the representation of the virtual ball 480 is, at a second time, displayed in the XR environment at a second location. In FIG. 4C3, the representation of the virtual ball 480 is, at a third time, displayed in the XR environment at a third location.

According to the timeline 454 in FIG. 4B, the representation of the virtual ball 480 moves at a uniform speed between the first location and the third location. Thus, when the second time is halfway between the first time and the third time, the second location is halfway along the path between the first location and the third location.

FIGS. 4D1 and 4D2 illustrate an animation of the GUI 401 of FIG. 4B in response to detecting an input 499C directed to the timeline 454. In various implementations, the input 499C is input by a user holding a finger or stylus on a touch-sensitive display at the location of the timeline 454. In various implementations, the input 499C is input by a user holding a mouse button while a cursor is displayed at the location of the timeline 454.

In FIG. 4D1, at a first time, the electronic device 110 detects a start of the input 499C at a location in the timeline 454. In FIG. 4D2, at a second time after the first time, the electronic device detects an end of the input 499C at the location in the timeline 454. In FIG. 4D2, as compared to FIG. 4D1, the ticks of the timeline 454 near the location of the input 499C have moved. In various implementations, ticks of the timeline 454 are repelled from the location of the input 499C. For example, ticks to the left of the location of the input 499C are moved to the left and ticks to the right of the location of the input 499C (including the second tick 452B) are moved to the right. In various implementations, ticks closer to the location of the input 499C are moved more than ticks further from the location of the input 499C.

Thus, as a particular example, the second tick 452B is moved to the right and is, in FIG. 4D2, associated with a distance along the timeline which is greater than the distance along the timeline as in FIG. 4D1 (or FIG. 4B). The second tick 452B remains, in FIG. 4D2, associated with the same distance along the path as in FIG. 4D1 (or FIG. 4B). Accordingly, the representation of the virtual ball 480 takes longer to reach the second location along the path.

Figure 4E:
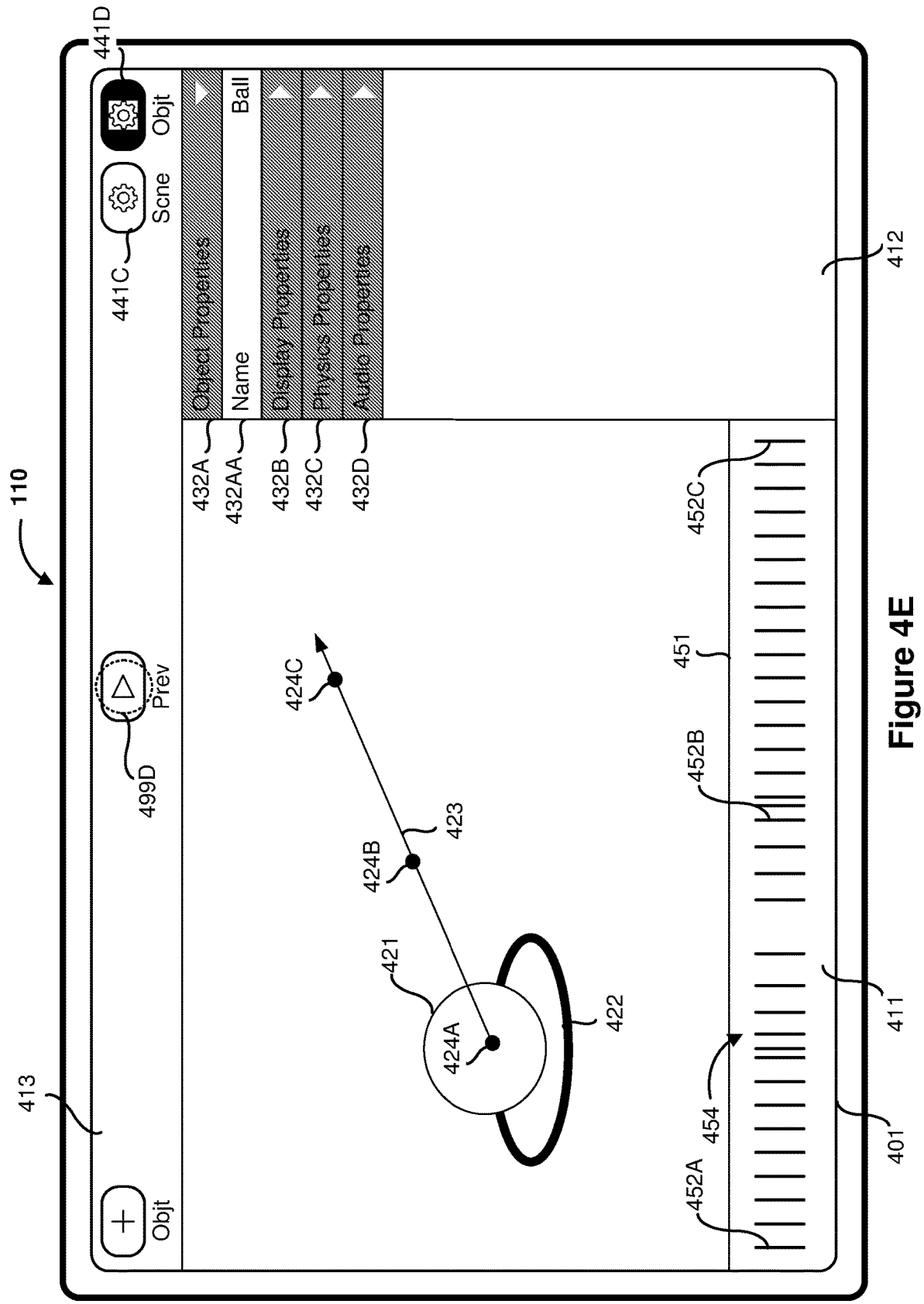

FIG. 4E illustrates the GUI 401 of FIG. 4D2 with an input 499D directed to the preview affordance 441B. In various implementations, the input 499D is input by a user tapping a finger or stylus on a touch-sensitive display at the location of the preview affordance 441B. In various implementations, the input 499D is input by a user clicking a mouse button while a cursor is displayed at the location of the preview affordance 441B.

FIGS. 4F1-4F3 illustrate an animation of the GUI 401 of FIG. 4E in response to detecting the input 499D directed to the preview affordance 441B. In response to detecting the input 499D directed to the preview affordance 441B, the preview affordance 441B is displayed in a different manner and the view region 411 and the settings region 412 are replaced with the preview region 414. In the preview region 414, an XR environment including the XR scene is displayed. In FIG. 4F1, a representation of the virtual ball 480 is, at a first time, displayed in the XR environment at a first location. In FIG. 4F2, the representation of the virtual ball 480 is, at a second time, displayed in the XR environment at a second location. In FIG. 4F3, the representation of the virtual ball 480 is, at a third time, displayed in the XR environment at a third location.

According to the timeline 454 in FIG. 4E, the representation of the virtual ball 480 changes speed along the path. Thus, when the second time is halfway between the first time and the third time, the second location is not halfway along the path, but closer to the first location than the halfway point. Rather, the representation of the virtual ball 480 reaches the halfway point at a fourth time between the second time and the third time wherein the time between the first time and the fourth time is proportional to the distance between the first tick 452A and the second tick 452B. Thus, in comparing FIG. 4F2 to FIG. 4C2, the location of the representation of the virtual ball 480 in FIG. 4F2 is closer to the first location than the location of the representation of the virtual ball 480 in FIG. 4C2.

FIGS. 4G1 and 4G2 illustrate an animation of the GUI 401 of FIG. 4E in response to detecting an input 499E directed to the timeline 454. In various implementations, the input 499E is input by a user moving a finger or stylus on a touch-sensitive display from the location of the timeline 454 in a direction along the timeline 454 (e.g., a horizontal direction). In various implementations, the input 499E is input by a user holding a mouse button of a mouse and moving the mouse in a direction along the timeline 454 while a cursor is displayed at the location of the timeline 454.

In FIG. 4G1, at a first time, the electronic device 110 detects a start of the input 499E at a first location in the timeline 454. In FIG. 4G2, at a second time after the first time, the electronic device detects an end of the input 499E at a second location in the timeline 454 in a direction from the first location. In FIG. 4G2, as compared to FIG. 4G1, the ticks of the timeline 454 near the first location of the input 499E and in the direction of the input 499E have moved. In various implementations, ticks of the timeline 454 in the direction of the input 499E are repelled from the first location of the input 499E. For example, the input 499E moves to the right and ticks to the right of the first location of the input 499E are moved to the right and ticks to the left of the location of the input 499E (including the second tick 452B) are unmoved. In various implementations, ticks closer to the first location of the input 499E are moved more than ticks further from the first location of the input 499E.

FIGS. 4H1 and 4H2 illustrate an animation of the GUI 401 of FIG. 4G2 in response to detecting an input 499F directed to the timeline 454. In various implementations, the input 499F is input by a user moving a finger or stylus on a touch-sensitive display from the location of the timeline 454 in a direction perpendicular to the timeline 454 (e.g., a vertical direction). In various implementations, the input 499F is input by a user holding a mouse button of a mouse and moving the mouse in a direction perpendicular to the timeline 454 while a cursor is displayed at the location of the timeline 454.

In FIG. 4H1, at a first time, the electronic device 110 detects a start of the input 499F at a first location in the timeline 454. In FIG. 4H2, at a second time after the first time, the electronic device detects an end of the input 499F at a second location in a direction from the first location. In FIG. 4H2, as compared to FIG. 4H1, the ticks of the timeline 454 near the first location of the input 499F have moved. In various implementations, ticks of the timeline 454 near the input 499F are attracted to the first location of the input 499F. For example, the input 499F moves upwards and ticks to the right of the first location of the input 499F are moved to the left and ticks to the left of the location of the input 499F are moved to the right. In various implementations, ticks closer to the first location of the input 499F are moved more than ticks further from the first location of the input 499F.

In various implementations, ticks of the timeline 454 near the input 499F are repelled from the first location of the input 499F. For example, if the input 499F were moving downwards, ticks to the right of the first location of the input 499F are moved to the right and ticks to the left of the location of the input 499F are moved to the right. In various implementations, ticks closer to the first location of the input 499F are moved more than ticks further from the first location of the input 499F.

FIGS. 4I1 and 4I2 illustrate an animation of the GUI 401 of FIG. 4H2 in response to detecting an input 499G directed to the timeline 454. In various implementations, the input 499G is input by a user moving two fingers on a touch-sensitive display apart from each other from a location of the timeline 454.

In FIG. 4I1, at a first time, the electronic device 110 detects a start of the input 499G at a location in the timeline 454. In FIG. 4I2, at a second time after the first time, the electronic device detects an end of the input 499G with the two fingers separated by a distance. In FIG. 4I2, as compared to FIG. 4I1, the ticks of the timeline 454 near the first location of the input 499G have moved. In various implementations, ticks of the timeline 454 near the location of the input 499G are repelled from the location of the input 499G. For example, ticks to the right of the first location of the input 499G are moved to the right and ticks to the left of the location of the input 499G are moved to the left. In various implementations, ticks closer to the first location of the input 499G are moved more than ticks further from the first location of the input 499G. In various implementations, the ticks are moved proportionally to the distance by which the two fingers are separated.

Figure 4J:
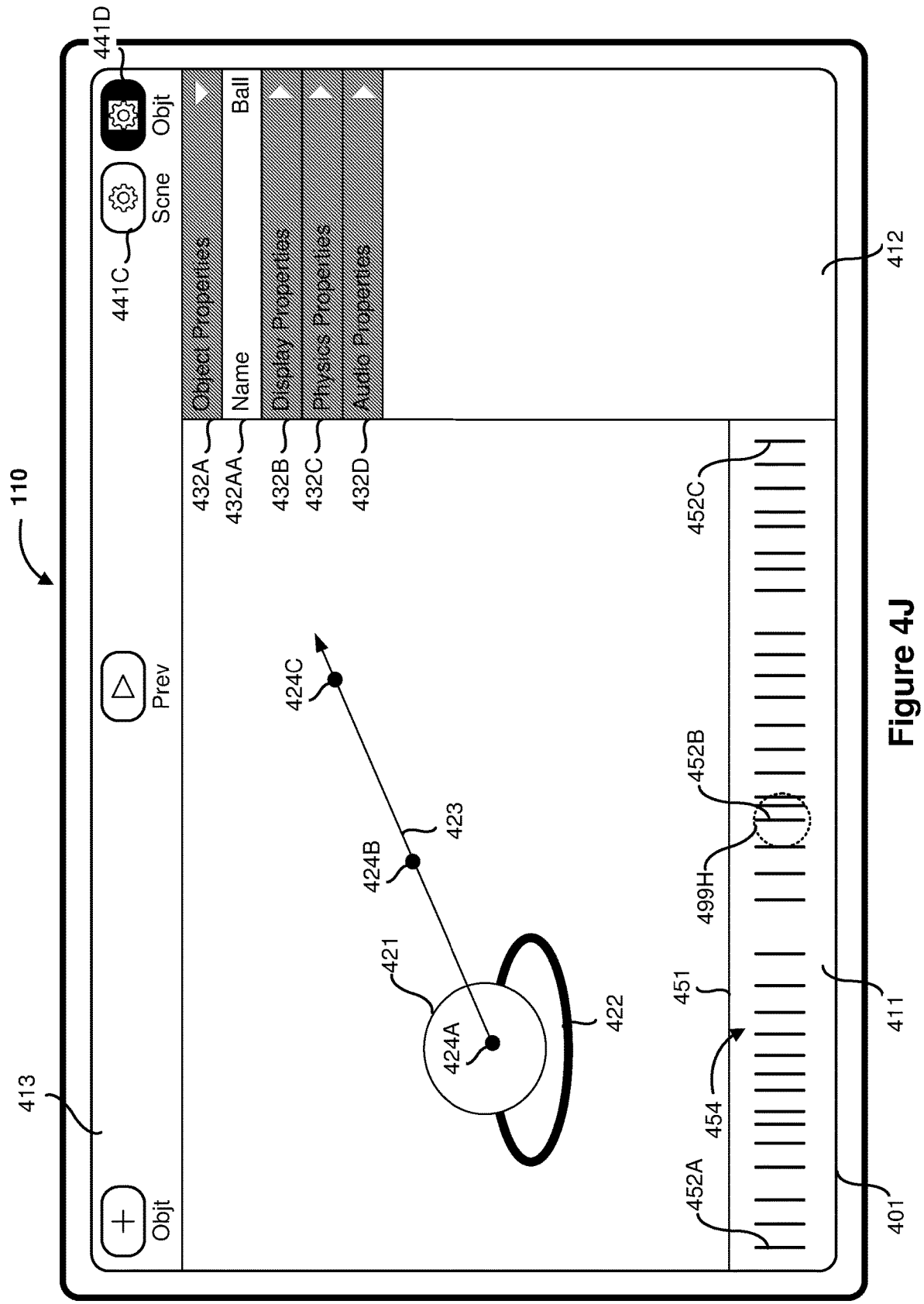

FIG. 4J illustrates the GUI 401 of FIG. 4I2 with an input 499H directed to the second tick 452B. In various implementations, the input 499H is input by a user tapping a finger or stylus on a touch-sensitive display at the location of the second tick 452B. In various implementations, the input 499H is input by a user clicking a mouse button while a cursor is displayed at the location of the second tick 452B.

Figure 4K:
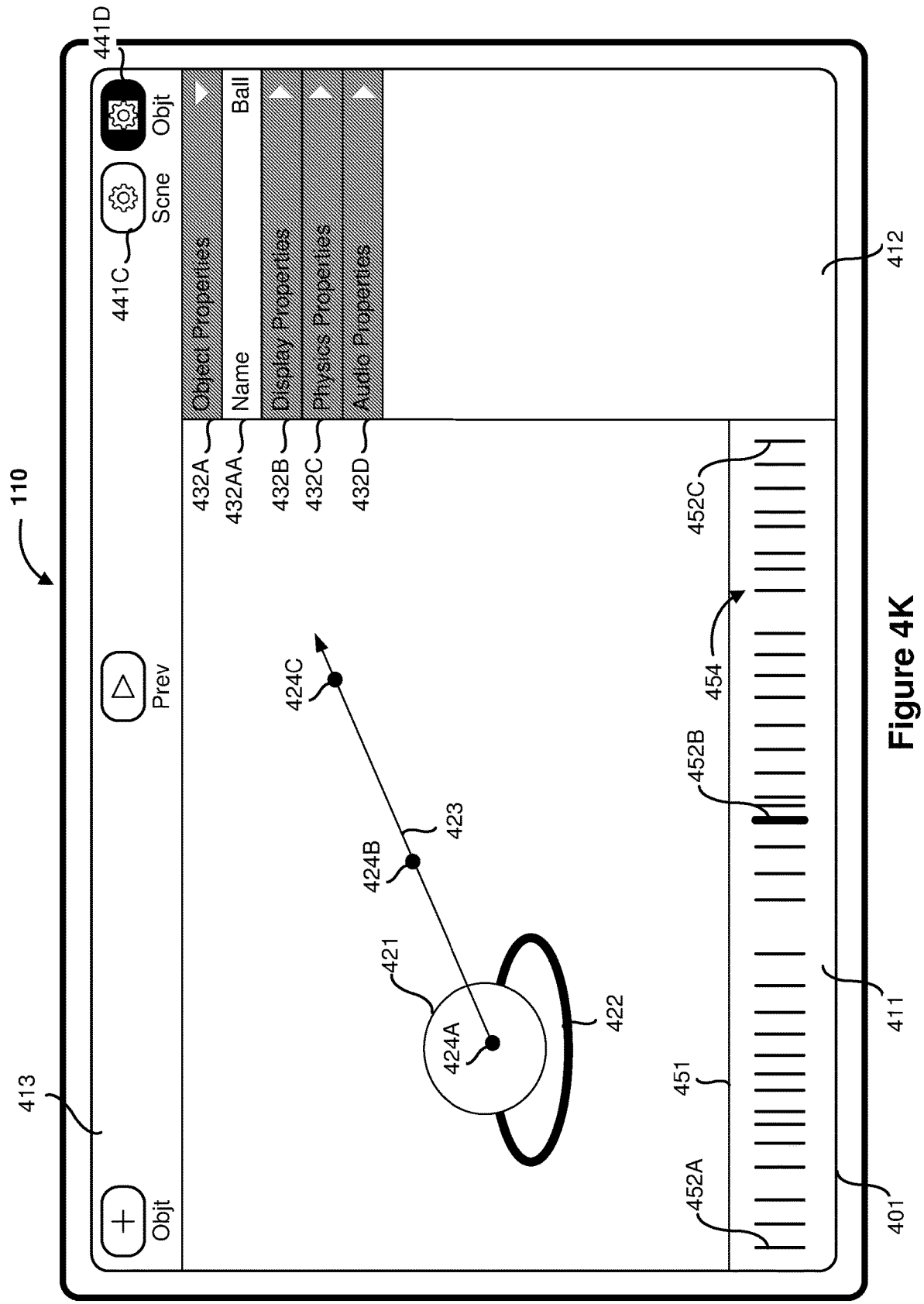

FIG. 4K illustrates the GUI 401 of FIG. 4J in response to detecting the input 499H directed to the second tick 452B. In response to detecting the input 499H directed to the second tick 452B, the second tick 452B is displayed with a lock indication indicating that the second tick 452B is locked. In FIG. 4K, the lock indication is an increased line width. When a tick is locked, user input directed to the timeline 454 does not move the tick. In various implementations, user input directed to the timeline 454 on one side of the tick does not move the tick or other ticks on an opposite side of the tick.

FIGS. 4L1 and 4L2 illustrate an animation of the GUI 401 of FIG. 4K in response to detecting an input 499I directed to the timeline 454. In various implementations, the input 499I is input by a user moving a finger or stylus on a touch-sensitive display from the location of the timeline 454 in a direction along the timeline 454. In various implementations, the input 499I is input by a user holding a mouse button of a mouse and moving the mouse in a direction along the timeline 454 while a cursor is displayed at the location of the timeline 454.

In FIG. 4L1, at a first time, the electronic device 110 detects a start of the input 499I at a first location in the timeline 454. In FIG. 4L2, at a second time after the first time, the electronic device detects an end of the input 499I at a second location in the timeline 454 in a direction from the first location. In FIG. 4L2, as compared to FIG. 4L1, the ticks of the timeline 454 near the first location of the input 499I and in the direction of the input 499I have moved. In particular, the ticks of the timeline 454 between the first location of the input 499I and the second tick 452B have moved in the direction of the input 499I. However, the second tick 452B, being locked, has not moved. Further, ticks on the opposite side of the second tick 452B as the first location of the input 499I have not moved.

FIGS. 4M1 and 4M2 illustrate an animation of the GUI 401 of FIG. 4L2 in response to detecting an input 499J directed to the timeline 454. In various implementations, the input 499J is input by a user moving two fingers from a first location and a second location closer together.

In FIG. 4M1, at a first time, the electronic device 110 detects a start of the input 499L at a first location in the timeline 454 and a second location in the timeline 454. In FIG. 4M2, at a second time after the first time, the electronic device detects an end of the input 499J. In FIG. 4M2, as compared to FIG. 4M1, the ticks of the timeline 454 near the first location of the input 499J and the second location of the input 499J have moved. In particular, the ticks of the timeline 454 between the first location of the input 499J and the second location of the input 499J have moved closer together. Further, ticks that are near the first location of the input 499J but not between the first location and the second location are moved towards the first location and ticks that are near the second location of the input 499J but not between the first location and the second location, such as the third tick 452C, are moved towards the second location.

Notably, in FIG. 4M2, the third tick 452C is moved, reducing its associated distance along the timeline and, being associated with third location 424C, the end location, reducing the length of the animation. In various implementations, the first tick and the last tick of the timeline 454 are locked, preventing changing the length of the animation. However, in various implementations, the length of the animation is changed by user input directed to the timeline 454.

Figure 4N:
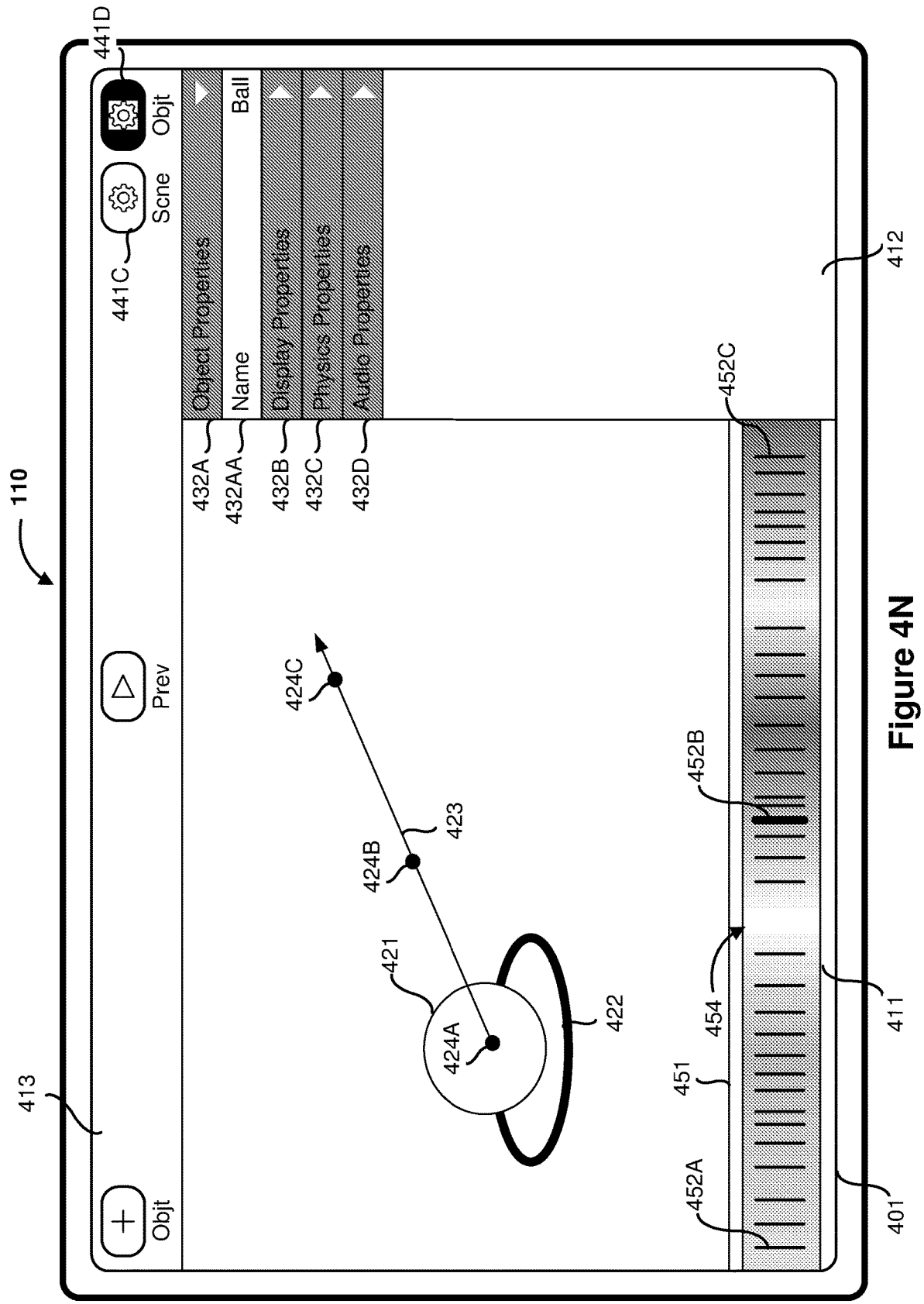

FIG. 4N illustrates the GUI 401 of FIG. 4M2 with a background in the animation timing region 451. In various implementations, a characteristic of the background is proportional to a density of ticks of the timeline 454. For example, in FIG. 4N, the darkness of the background at a particular location along the timeline 454 is proportional to a tick density at the particular location along the timeline 454. As another example, in various implementations, a color of the background at a particular location along the timeline 454 is proportional to a tick density at the particular location along the timeline 454.

Figure 4O:
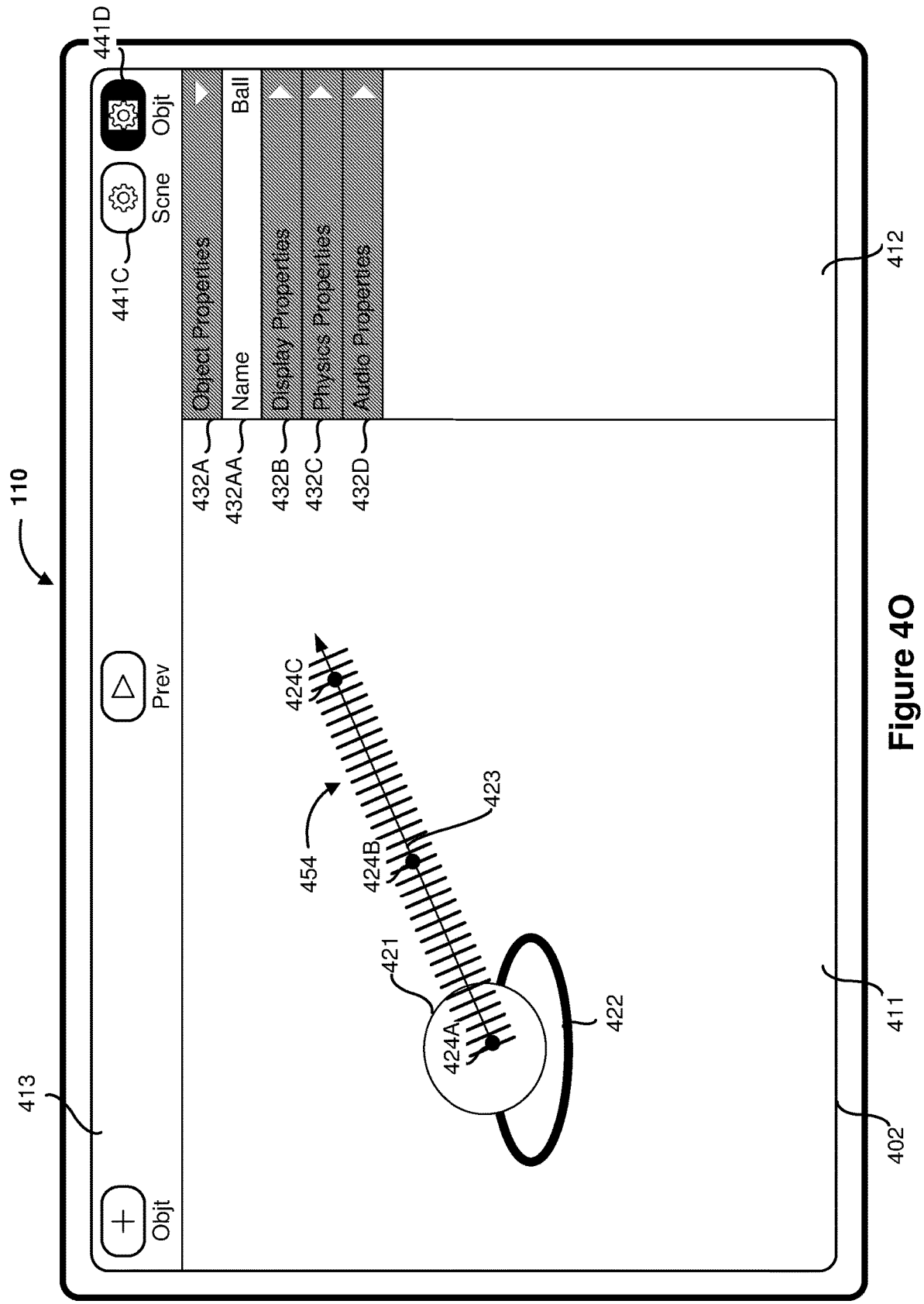

FIG. 4O illustrates a GUI 402 substantially similar to the GUI 401 of FIG. 4B except that, in FIG. 4O, the timeline 454 is displayed over the representation of the path 423 rather than in the animation timing region 451. In the GUI 402 of FIG. 4O, as in the previous examples, user input directed to the timeline changes the respective distances along the timeline of two or more of the plurality of ticks.

FIG. 5 is a flowchart representation of a method 500 of manipulating the timing of an animation accordance with some implementations. In various implementations, the method 500 is performed by a device with a display, one or more input devices, one or more processors, and non-transitory memory. In some implementations, the method 500 is performed by processing logic, including hardware, firmware, software, or a combination thereof. In some implementations, the method 500 is performed by a processor executing instructions (e.g., code) stored in a non-transitory computer-readable medium (e.g., a memory).

The method 500 begins, in block 510, with the device displaying, using a display, a timeline for an animation of an object moving along a path, wherein the timeline includes a plurality of ticks, wherein each of the plurality of ticks is associated with a respective distance along the timeline and a respective distance along the path, wherein the respective distance along the timeline is proportional to an amount of time for the object to move the respective distance along the path. Thus, each of the plurality of ticks is associated with a respective position along the timeline and a respective position along the path. The respective position along the timeline indicates a time at which the object reaches the respective position along the path.

For example, in FIG. 4B, the electronic device 110 displays the timeline 454 with a plurality of ticks. Each of the plurality of ticks is associated with a distance along the timeline 454 and a respective distance along the path. For example, the first tick 452A is associated with a distance along the timeline 454 of zero and a distance along the path of zero. As another example, the second tick 452B is associated with a distance along the timeline 454 of half the length of the timeline 454 and a distance along the path of half the length of the path.

The method 500 continues, in block 520, with the device receiving, using one or more input devices, an input within the timeline. For example, in FIGS. 4D1 and 4D2, the electronic device 110 receives a press-and-hold input. As another example, in FIGS. 4G1 and 4G1, the electronic device 110 receives a swipe input. Various other inputs (and their effects) are described in detail below.

The method 500 continues, in block 530, with the device, in response to receiving the input within the timeline, changing the respective distances along the timeline of two or more of the plurality of ticks. For example, in FIG. 4D2, in response to the input 499C, the second tick 452B is moved along the timeline 454 further from the location of the input 499C.

Figure 6A:
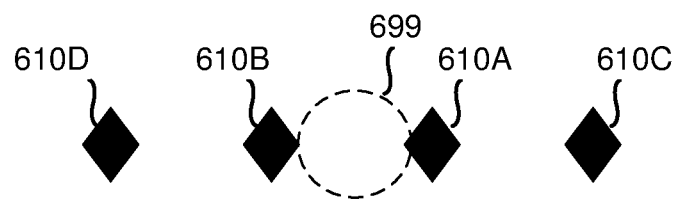
FIGS. 6A-6C illustrate an animation of a timeline in response to an input associated with an input location and an input duration.
Figure 6B:
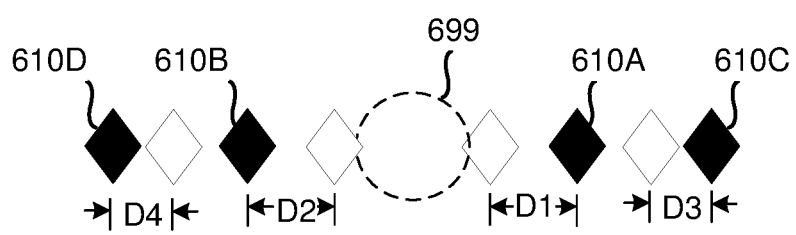
Figure 6C:
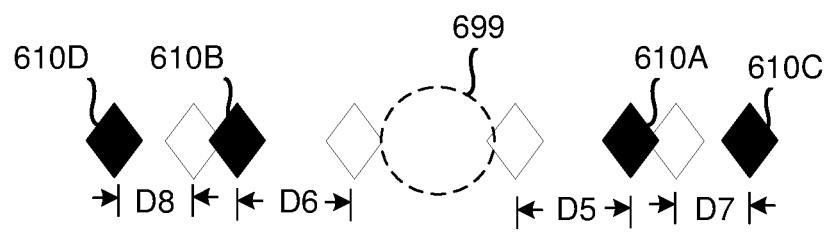

FIGS. 4D1 and 4D2 illustrate an embodiment in which a press-and-hold input results in ticks being spread apart. FIGS. 6A-6C illustrate an animation of a timeline in response to an input 699 associated with an input location and an input duration. FIGS. 6B and 6C illustrate the original locations of the ticks (in FIG. 6A) as outlines. FIG. 6A illustrates a timeline at a first time including a first tick 610A on a first side of the input location, a second tick 610B on a second side of the input location, a third tick 610C on the first side of the input location further from the input location than the first tick, and a fourth tick 610D on the second side of the input location further from the input location than the second tick. FIG. 6B illustrates the timeline at a second time after the first time including the first tick 610A moved a first distance D1 away from the input location, the second tick 610B moved a second distance D2 away from the input location, the third tick 610C moved a third distance D3 away from the input location, and the fourth tick 610D moved a fourth distance D4 away from the input location. FIG. 6C illustrates the timeline at a third time after the second time including the first tick 610A moved a fifth distance D5 away from the input location, the second tick 610B moved a sixth distance D6 away from the input location, the third tick 610C moved a seventh distance D7 away from the input location, and the fourth tick 610D moved an eighth distance D8 away from the input location.

Referring again to FIG. 5, in various implementations of the method 500, the input is associated with an input location and an input duration. For example, FIGS. 6A-6C illustrates an animation of a timeline in response to the input 699 associated with an input location and an input duration.

In various implementations, the plurality of ticks includes a first tick on a first side of input location and a second tick on a second side of the input location. For example, FIGS. 6A-6C illustrate the first tick 610A on a first side of the input location and the second tick 610B on the second side of the input location.

In various implementations, changing the respective distances, in block 530, includes moving the first tick a first distance in a first direction based on the input duration and moving the second tick a second distance in a second direction based on the input duration. For example, between the first time of FIG. 6A and the second time of FIG. 6B, the first tick 610A has moved the first distance D1 and the second tick 610B has moved the second distance D2. Comparatively, between the first time of FIG. 6A and the third time of FIG. 6C, the first tick 610A has moved the fifth distance D5 (greater than the first distance D1) and the second tick 610B has moved the sixth distance D6 (greater than the second distance D2).

In various implementations, moving the first tick in the first direction and moving the second tick in the second direction includes moving the first tick and the second tick further away from the input location. For example, in FIG. 6B, the first tick and the second tick have moved further away from the input location. In various implementations, moving the first tick in the first direction and moving the second tick in the second direction includes moving the first tick and the second tick closer to the input location. Thus, in various implementations, a press-and-hold input spreads the plurality of ticks and in various implementations, a press-and-hold input compresses the plurality of ticks.

In various implementations, the plurality of ticks further includes a third tick on the first side of the input location further from the input location than the first tick and a fourth tick on the second side of the input location further from the input location than the second tick. For example, in FIGS. 6A-6C, the timeline includes the third tick 610C on the first side of the input location further from the input location than the first tick 610A and the fourth tick 610D on the second side of the input location further from the input location than the second tick 610B. In various implementations, changing the respective distances, in block 530, includes moving the third tick a third distance in the first direction based on the input duration and moving the fourth tick a fourth distance in the second direction based on the input duration, wherein the third distance is less than the first distance and the fourth distance is less than the second distance. For example, between the first time of FIG. 6A and the second time of FIG. 6B, the third tick 610C has moved the third distance D3 (less than the first distance D1) and the fourth tick 610D has moved the fourth distance D4 (less than the second distance D2).

In various implementations, the fifth distance D5 is not equal to (e.g., is greater than) the first distance D1, the sixth distance D6 is not equal to (e.g., is greater than) the second distance D2, the seventh distance D7 is not equal to (e.g., is greater than) the third distance D3, and the eighth distance D8 is not equal to (e.g., is greater than) the fourth distance D4. In various implementations, the third distance D3 is not equal to (e.g., is less than) the first distance D1, the fourth distance D4 is not equal to (e.g., is less than) the second distance D2, the seventh distance D7 is not equal to (e.g., is less than) the fifth distance D5, and the eighth distance D8 is not equal to (e.g., is less than) the sixth distance D6. In various implementations, the difference between the fifth distance D5 and the seventh distance D7 is greater than the difference between the first distance D1 and the third distance D3 and the difference between the sixth distance D6 and the eighth distance D8 is greater than the difference between the second distance D2 and the fourth distance D1.

Figure 7A:
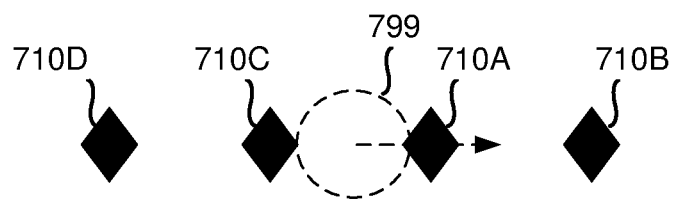
FIGS. 7A-7C illustrate an animation of a timeline in response to an input associated with an input location and an input distance moved in a direction along the timeline on a first side of the input location.
Figure 7B:
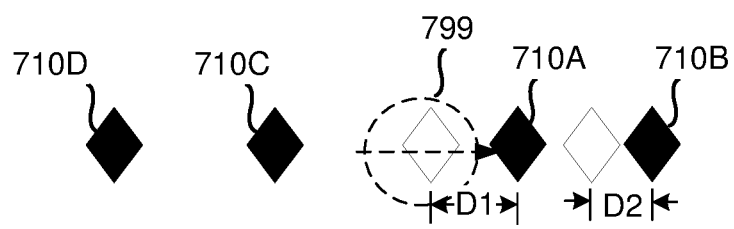
Figure 7C:
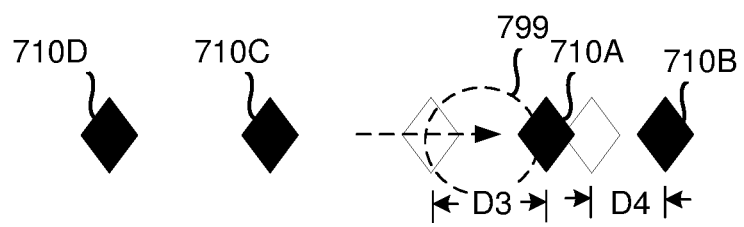

FIGS. 4G1 and 4G2 illustrate an embodiment in which a swipe input along the timeline results in ticks being shifted in the direction of the swipe input. FIGS. 7A-7C illustrate an animation of a timeline in response to an input 799 associated with an input location and an input distance moved in a direction along the timeline on a first side of the input location. FIGS. 7B and 7C illustrate the original locations of the ticks (in FIG. 7A) as outlines. FIG. 7A illustrates a timeline at a first time including a first tick 710A on the first side of the input location, a second tick 710B on a first side of the input location further from the input location than the first tick 710A, a third tick 710C on a second side of the input location, and a fourth tick 710D on the second side of the input location further from the input location than the third tick 710C. FIG. 7B illustrates the timeline at a second time after the first time when the input 799 has moved a first distance. The timeline at the second time includes the first tick 710A moved a first distance D1 away from the input location, the second tick 710B moved a second distance D2 away from the input location, the third tick 710C unmoved, and the fourth tick 710D unmoved. FIG. 7C illustrates the timeline at a third time after the second time the when the input 799 has moved a second distance. The timeline at the third time includes the first tick 710A moved a third distance D3 away from the input location, the second tick 710B moved a fourth distance D4 away from the input location, the third tick 710C unmoved, and the fourth tick 710D unmoved.

Referring again to FIG. 5, in various implementations of the method 500, the input is associated with an input location and an input distance moved in a direction along the timeline on a first side of the input location. For example, FIGS. 7A-7C illustrate an animation of a timeline in response to the input 799 associated with an input location and an input distance moved in a direction along the timeline on a first side of the input location.

In various implementations, the plurality of ticks includes a first tick on the first side of the input location, a second tick on the first side of the input location further from the input location than the first tick, and a third tick on a second side of the input location opposite the first side. For example, in FIGS. 7A-7C, the timeline includes the first tick 710A on the first side of the input location, the second tick 710B on the first side of the input location further from the input location than the first tick 710A, and the third tick 710C on the second side of the input location.

In various implementations, changing the respective distances, in block 530, includes moving the first tick a first distance further away from the input location based on the input distance and moving the second tick a second distance further away from the input location based on the input distance without moving the third tick. For example, between the first time of FIG. 7A and the second time of FIG. 7B, the first tick 710A has moved the first distance D1 and the second tick 710B has moved the second distance D2. Comparatively, between the first time of FIG. 7A and the third time of FIG. 7C, the first tick 710A has moved the third distance D3 (greater than the first distance D1) and the second tick 710B has moved the fourth distance D4 (greater than the second distance D2). Further, the third tick 710C is unmoved in FIGS. 7A-7C.

In various implementations, the second distance is less than the first distance. For example, in FIG. 7B, the second distance D2 is less than the first distance D1.

In various implementations, the third distance D3 is not equal to (e.g., is greater than) the first distance D1 and the fourth distance D4 is not equal to (e.g., is greater than) the second distance D2. In various implementations, the second distance D2 is not equal to (e.g., is less than) the first distance D1 and the fourth distance D4 is not equal to (e.g., is less than) the third distance D3. In various implementations, the difference between the third distance D3 and the fourth distance D4 is greater than the difference between the first distance D1 and the second distance D2.

Figure 8A:
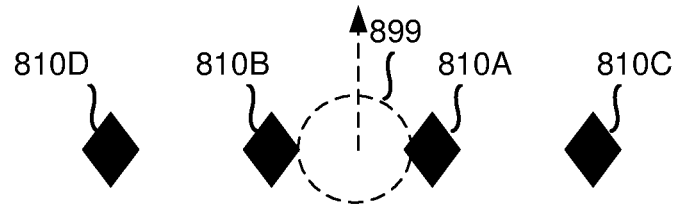
FIGS. 8A-8C illustrate an animation of a timeline in response to an input associated with an input location and an input distance moved in a direction perpendicular the timeline in a first direction.
Figure 8B:
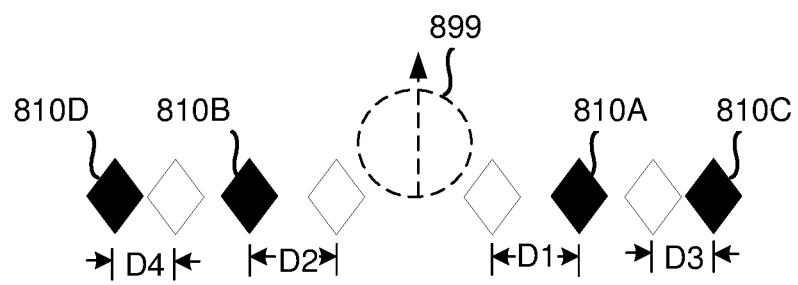
Figure 8C:
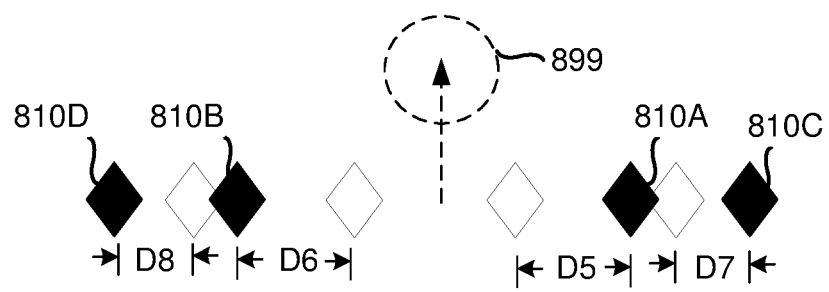
Figure 9A:
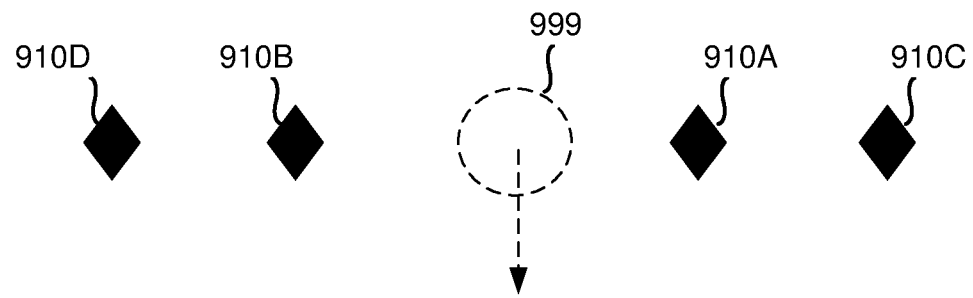
FIGS. 9A-9C illustrate an animation of a timeline in response to an input associated with an input location and an input distance moved in a direction perpendicular the timeline in a second direction.
Figure 9B:
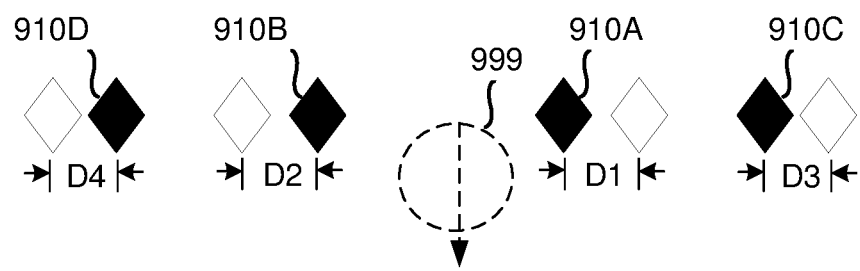
Figure 9C:
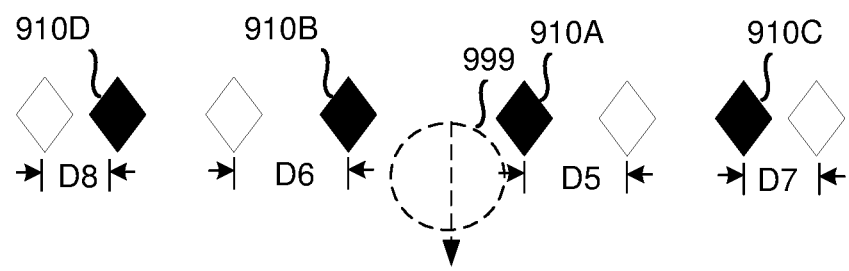

FIGS. 4H1 and 4H2 illustrate an embodiment in which a swipe input perpendicular to the timeline results in ticks being spread apart or compressed. FIGS. 8A-8C illustrate an animation of a timeline in response to an input 899 associated with an input location and an input distance moved in a direction perpendicular the timeline in a first direction. FIGS. 8B and 8C illustrate the original locations of the ticks (in FIG. 8A) as outlines. FIGS. 9A-9C illustrate an animation of a timeline in response to an input 999 associated with an input location and an input distance moved in a direction perpendicular the timeline in a second direction. FIGS. 9B and 9C illustrate the original locations of the ticks (in FIG. 9A) as outlines.

FIG. 8A illustrates a timeline at a first time including a first tick 810A on a first side of the input location, a second tick 810B on a second side of the input location, a third tick 810C on the first side of the input location further from the input location than the first tick, and a fourth tick 810D on the second side of the input location further from the input location than the second tick. FIG. 8B illustrates the timeline at a second time after the first time when the input 899 has moved a first distance. The timeline at the second time includes the first tick 810A moved a first distance D1 away from the input location, the second tick 810B moved a second distance D2 away from the input location, the third tick 810C moved a third distance D3 away from the input location, and the fourth tick 810D moved a fourth distance D4 away from the input location. FIG. 8C illustrates the timeline at a third time after the second time when the input 899 has moved a second distance. The timeline at the third time includes the first tick 810A moved a fifth distance D5 away from the input location, the second tick 810B moved a sixth distance D6 away from the input location, the third tick 810C moved a seventh distance D7 away from the input location, and the fourth tick 810D moved an eighth distance D8 away from the input location.

FIG. 9A illustrates a timeline at a first time including a first tick 910A on a first side of the input location, a second tick 910B on a second side of the input location, a third tick 910C on the first side of the input location further from the input location than the first tick, and a fourth tick 910D on the second side of the input location further from the input location than the second tick. FIG. 9B illustrates the timeline at a second time after the first time when the input 999 has moved a first distance. The timeline at the second time includes the first tick 910A moved a first distance D1 closer to the input location, the second tick 910B moved a second distance D2 closer to the input location, the third tick 910C moved a third distance D3 closer to the input location, and the fourth tick 910D moved a fourth distance D4 closer to the input location. FIG. 9C illustrates the timeline at a third time after the second time when the input 999 has moved a second distance. The timeline at the third time includes the first tick 910A moved a fifth distance D5 closer to the input location, the second tick 910B moved a sixth distance D6 closer to the input location, the third tick 910C moved a seventh distance D7 closer to the input location, and the fourth tick 910D moved an eighth distance D8 closer to the input location.

Referring again to FIG. 5, in various implementations of the method 500, the input is associated with an input location and an input distance moved in a direction perpendicular to the timeline. For example, FIGS. 8A-8C illustrates an animation of a timeline in response to the input 899 associated with an input location and an input distance moved in a direction perpendicular to the timeline in a first direction. As another example, FIGS. 9A-9C illustrate an animation of a timeline in response to the input 999 associated with an input location and an input distance moved in a direction perpendicular to the timeline in a second direction.

In various implementations, the plurality of ticks includes a first tick on a first side of the input location and a second tick on a second side of the input location. For example, in FIGS. 8A-8C, the timeline includes the first tick 810A on the first side of the input location and the second tick 810B on the second side of the input location. As another example, in FIGS. 9A-9C, the timeline includes the first tick 910A on the first side of the input location and the second tick 910B on the second side of the input location.

In various implementations, changing the respective distances, in block 530, includes moving the first tick a first distance based on the input distance and moving the second tick a second distance based on the input distance. For example, between the first time of FIG. 8A and the second time of FIG. 8B, the first tick 810A has moved the first distance D1 and the second tick 810B has moved the second distance D2. Comparatively, between the first time of FIG. 8A and the third time of FIG. 8C, the first tick 810A has moved the fifth distance D5 (greater than the first distance D1) and the second tick 810B has moved the sixth distance D6 (greater than the second distance D2).

As another example, between the first time of FIG. 9A and the second time of FIG. 9B, the first tick 910A has moved the first distance D1 and the second tick 910B has moved the second distance D2. Comparatively, between the first time of FIG. 9A and the third time of FIG. 9C, the first tick 910A has moved the fifth distance D5 (greater than the first distance D1) and the second tick 910B has moved the sixth distance D6 (greater than the second distance D2).

In various implementations, in response to determining that the direction perpendicular to the timeline is a first direction, moving the first tick and moving the second tick includes moving the first tick and the second tick further away from the input location and, in response to determining that the direction perpendicular to the timeline is a second direction, moving the first tick and moving the second tick includes moving the first tick and the second tick closer to the input location. For example, in FIGS. 8A-8C, in response to determining that the input 899 is moved in a first direction (e.g., up), the first tick 810A and the second tick 810B are moved further away from the input location. However, in FIGS. 9A-9C, in response to determining that the input 999 is moved in a second direction (e.g., down), the first tick 910A and the second tick 910B are moved closer to the input location.

Figure 10A:
FIGS. 10A-10C illustrate an animation of a timeline in response to an input associated with a first contact and a second contact moving towards each other.
Figure 10B:
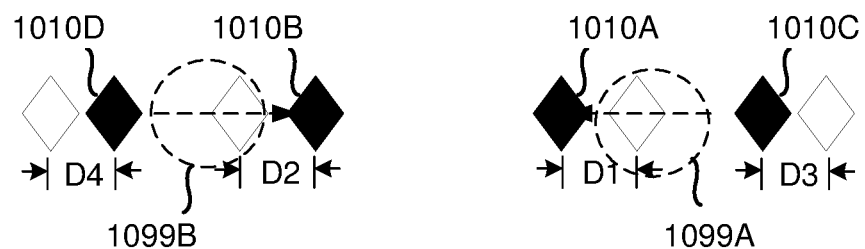
Figure 10C:
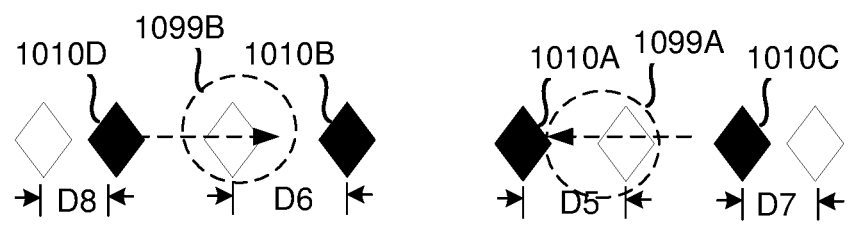
Figure 11A:
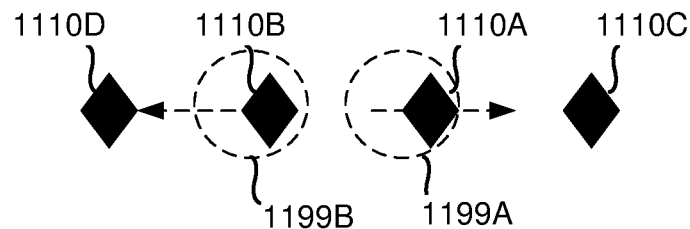
FIGS. 11A-11C illustrate an animation of a timeline in response to an input associated with a first contact and a second contact moving away from each other.
Figure 11B:
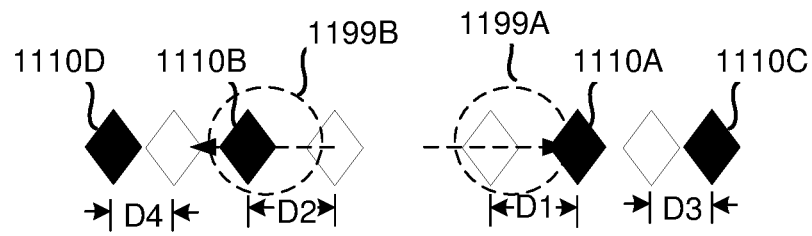
Figure 11C:
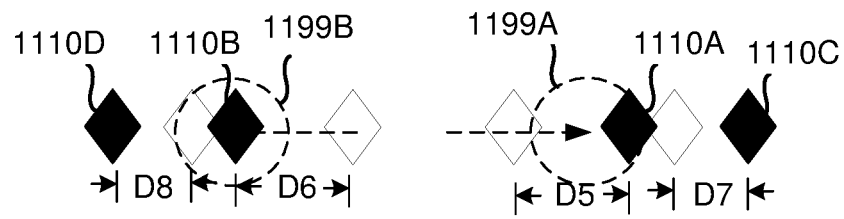

FIGS. 411 and 412 illustrate an embodiment in which a de-pinch input on the timeline results in ticks being spread apart. FIGS. 10A-10C illustrate an animation of a timeline in response to an input associated with a first contact 1099A and a second contact 1099B moving towards each other. FIGS. 10B and 10C illustrate the original locations of the ticks (in FIG. 10A) as outlines. FIGS. 11A-11C illustrate an animation of a timeline in response to an input associated with a first contact 1199A and a second contact 1199B moving away from each other. FIGS. 11B and 11C illustrate the original locations of the ticks (in FIG. 11A) as outlines.

FIG. 10A illustrates a timeline at a first time including a first tick 1010A on a first side of the input location between the first contact 1099A and the second contact 1099B, a second tick 1010B on a second side of the input location, a third tick 1010C on the first side of the input location further from the input location than the first tick, and a fourth tick 1010D on the second side of the input location further from the input location than the second tick. FIG. 10B illustrates the timeline at a second time after the first time when the first contact 1099A and second contact 1099B have moved closer to each other by a first distance. The timeline at the second time includes the first tick 1010A moved a first distance D1 closer to the input location, the second tick 910B moved a second distance D2 closer to the input location, the third tick 910C moved a third distance D3 closer to the input location, and the fourth tick 910D moved a fourth distance D4 closer to the input location. FIG. 9C illustrates the timeline at a third time after the second time when the first contact 1099A and second contact 1099B have moved closer to each other by a second distance. The timeline at the third time includes the first tick 1010A moved a fifth distance D5 closer to the input location, the second tick 1010B moved a sixth distance D6 closer to the input location, the third tick 1010C moved a seventh distance D7 closer to the input location, and the fourth tick 1010D moved an eighth distance D8 closer to the input location.

FIG. 11A illustrates a timeline at a first time including a first tick 1110A on a first side of an input location between the first contact 1199A and the second contact 1199B, a second tick 1110B on a second side of the input location, a third tick 1110C on the first side of the input location further from the input location than the first tick, and a fourth tick 1110D on the second side of the input location further from the input location than the second tick. FIG. 11B illustrates the timeline at a second time after the first time when the first contact 1199A and the second contact 1199B have moved further from each other by a first distance. The timeline at the second time includes the first tick 1110A moved a first distance D1 away from the input location, the second tick 1110B moved a second distance D2 away from the input location, the third tick 1110C moved a third distance D3 away from the input location, and the fourth tick 1110D moved a fourth distance D4 away from the input location. FIG. 11C illustrates the timeline at a third time after the second time when the first contact 1199A and the second contact 1199B have moved further from each other by a second distance. The timeline at the third time includes the first tick 1110A moved a fifth distance D5 away from the input location, the second tick 1110B moved a sixth distance D6 away from the input location, the third tick 1110C moved a seventh distance D7 away from the input location, and the fourth tick 1110D moved an eighth distance D8 away from the input location.

Referring again to FIG. 5, in various implementations of the method 500, the input is associated with a first contact and a second contact. For example, FIGS. 10A-10C illustrate an animation of a timeline in response to the first contact 1099A and the second contact 1099B. As another example, FIGS. 11A-11C illustrate an animation of a timeline in response to the first contact 1199A and the second contact 1199B.

In various implementations, the plurality of ticks includes a first tick on a first side of an input location between the first contact and the second contact and a second tick on a second side of the input location. For example, in FIGS. 10A-10C, the timeline includes the first tick 1010A on the first side of an input location between the first contact 1099A and the second contact 1099B and the second tick 1010B on the second side of the input location. As another example, in FIGS. 11A-11C, the timeline includes the first tick 1110A on the first side of an input location between the first contact 1199A and the second contact 1199B and the second tick 1110B on the second side of the input location.

In various implementations, in response to determining that the first contact and the second contact are moving towards each other, changing the respective distances, in block 530, includes moving the first tick and the second tick closer to the input location and, in response to determining that the first contact and the second contact are moving away from each other, changing the respective distances includes moving the first tick and the second tick further away from the input location. For example, in FIGS. 10A-10C, in response to determining that the first contact 1099A and the second contact 1099B are moving towards each other, the first tick 1010A and the second tick 1010B are moved closer to the input location (and each other). As another example, in FIGS. 11A-11C, in response to determining that the first contact 1199A and the second contact 1199B are moving away from each other, the first tick 1110A and the second tick 1110B are moved further away from the input location (and each other).

In various implementations, changing the respective distances, in block 530, includes, in accordance with a determination that a first tick is not locked, moving the first tick and, in accordance with a determination that the first tick is locked, forgoing moving the first tick. For example, in FIGS. 4L1 and 4L2, the input 499I would move the second tick 452B were it not locked.

In various implementations, the timeline is displayed over a representation of the path. For example, in FIG. 4O, the timeline 454 is displayed over a representation of the path 423.

In various implementations, the method 500 further includes displaying a timeline background, wherein a display characteristic of the timeline background at a particular location along the timeline is proportional to a tick density at the particular location along the timeline. For example, in FIG. 4N, the animation timing region 451 includes a background, wherein a characteristic of the background is proportional to a density of ticks of the timeline 454. In various implementations, the display characteristic is at least one of darkness, brightness, or color.

In various implementations, the method 500 further includes displaying the animation of the object moving along the path based on timeline. In various implementations, a speed of the object moving along the path is greater where consecutive ticks are closer together and is slower where consecutive ticks are further apart.

For example, in FIGS. 4C1-4C3, an animation is displaced according to the timeline 454 in FIG. 4B in which the representation of the virtual ball 480 moves at a uniform speed between the first location and the third location. As another example, in FIGS. 4F1-4F3, an animation is displayed according to the timeline 454 in FIG. 4E in which the representation of the virtual ball 480 changes speed along the path.

Figure 12:
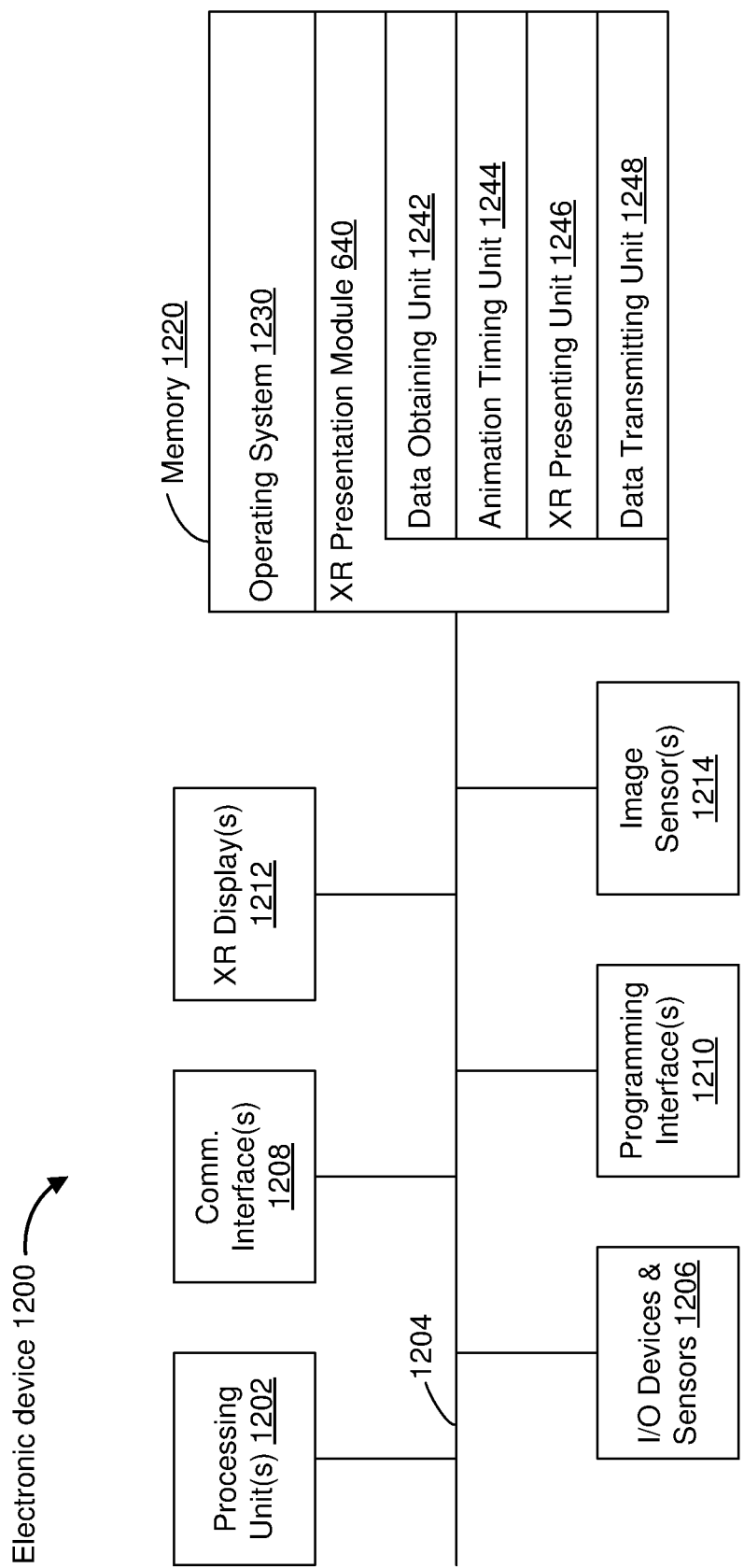
FIG. 12 is a block diagram of an electronic device in accordance with some implementations.

FIG. 12 is a block diagram of an electronic device 1200 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the electronic device 1200 includes one or more processing units 1202 (e.g., microprocessors, ASICs, FPGAs, GPUs, CPUs, processing cores, and/or the like), one or more input/output (I/O) devices and sensors 1206, one or more communication interfaces 1208 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 1210, one or more XR displays 1212, one or more optional interior- and/or exterior-facing image sensors 1214, a memory 1220, and one or more communication buses 1204 for interconnecting these and various other components.

In some implementations, the one or more communication buses 1204 include circuitry that interconnects and controls communications between system components. In some implementations, the one or more I/O devices and sensors 1206 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more XR displays 1212 are configured to present XR content to the user. In some implementations, the one or more XR displays 1212 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more XR displays 1212 correspond to diffractive, reflective, polarized, holographic, etc. waveguide displays. For example, the electronic device 1200 includes a single XR display. In another example, the electronic device 1200 includes an XR display for each eye of the user. In some implementations, the one or more XR displays 1212 are capable of presenting AR, MR, and/or VR content.

In various implementations, the one or more XR displays 1212 are video passthrough displays which display at least a portion of a physical environment as an image captured by a scene camera. In various implementations, the one or more XR displays 1212 are optical see-through displays which are at least partially transparent and pass light emitted by or reflected off the physical environment.

In some implementations, the one or more image sensors 1214 are configured to obtain image data that corresponds to at least a portion of the face of the user that includes the eyes of the user (any may be referred to as an eye-tracking camera). In some implementations, the one or more image sensors 1214 are configured to be forward-facing so as to obtain image data that corresponds to the physical environment as would be viewed by the user if the electronic device 1200 was not present (and may be referred to as a scene camera). The one or more optional image sensors 1214 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 1220 includes high-speed random-access memory, such as DRAM, SRAM, DDR RAM, or other random-access solid-state memory devices. In some implementations, the memory 1220 includes non-volatile memory, such as one or more magnetic disk storage devices, optical disk storage devices, flash memory devices, or other non-volatile solid-state storage devices. The memory 1220 optionally includes one or more storage devices remotely located from the one or more processing units 1202. The memory 1220 comprises a non-transitory computer readable storage medium. In some implementations, the memory 1220 or the non-transitory computer readable storage medium of the memory 1220 stores the following programs, modules and data structures, or a subset thereof including an optional operating system 1230 and an XR presentation module 1240.

The operating system 1230 includes procedures for handling various basic system services and for performing hardware dependent tasks. In some implementations, the XR presentation module 1240 is configured to present XR content to the user via the one or more XR displays 1212. To that end, in various implementations, the XR presentation module 1240 includes a data obtaining unit 1242, an animation timing unit 1244, an XR presenting unit 1246, and a data transmitting unit 1248.

In some implementations, the data obtaining unit 1242 is configured to obtain data (e.g., presentation data, interaction data, sensor data, location data, etc.). The data may be obtained from the one or more processing units 1202 or another electronic device. To that end, in various implementations, the data obtaining unit 1242 includes instructions and/or logic therefor, and heuristics and metadata therefor.

In some implementations, the animation timing unit 1244 is configured to provide an interface for changing the animation timing of an object moving along a path. For example, FIGS. 4A-4N illustrate a GUI 401 for changing the animation timing of a virtual ball moving along a path. To that end, in various implementations, the animation timing unit 1244 includes instructions and/or logic therefor, and heuristics and metadata therefor.

In some implementations, the XR presenting unit 1246 is configured to present XR content via the one or more XR displays 1212. To that end, in various implementations, the XR presenting unit 1246 includes instructions and/or logic therefor, and heuristics and metadata therefor.

In some implementations, the data transmitting unit 1248 is configured to transmit data (e.g., presentation data, location data, etc.) to the one or more processing units 1202, the memory 1220, or another electronic device. To that end, in various implementations, the data transmitting unit 1248 includes instructions and/or logic therefor, and heuristics and metadata therefor.

Although the data obtaining unit 1242, the animation timing unit 1244, the XR presenting unit 1246, and the data transmitting unit 1248 are shown as residing on a single electronic device 1200, it should be understood that in other implementations, any combination of the data obtaining unit 1242, the animation timing unit 1244, the XR presenting unit 1246, and the data transmitting unit 1248 may be located in separate computing devices.

Moreover, FIG. 12 is intended more as a functional description of the various features that could be present in a particular implementation as opposed to a structural schematic of the implementations described herein. As recognized by those of ordinary skill in the art, items shown separately could be combined and some items could be separated. For example, some functional modules shown separately in FIG. 12 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
at a device including one or more processors and non-transitory memory:
displaying, using a display, a timeline for an animation of an object moving along a path, wherein the timeline includes a plurality of ticks, wherein each of the plurality of ticks is associated with a respective distance along the timeline and a respective distance along the path, wherein the respective distance along the timeline is proportional to an amount of time for the object to move the respective distance along the path;
receiving, using one or more input devices, an input within the timeline; and
in response to receiving the input within the timeline, changing the respective distances along the timeline of two or more of the plurality of ticks and the amounts of time for the object to move the respective distances along the path of the two or more of the plurality of ticks.

2. The method of claim 1, wherein the input is associated with an input location and an input duration, wherein the plurality of ticks includes a first tick on a first side of the input location and a second tick on a second side of the input location, wherein changing the respective distances includes moving the first tick a first distance in a first direction based on the input duration and moving the second tick a second distance in a second direction based on the input duration.

3. The method of claim 2, wherein moving the first tick in the first direction and moving the second tick in the second direction includes moving the first tick and the second tick further away from the input location.

4. The method of claim 2, wherein the plurality of ticks further includes a third tick on the first side of the input location further from the input location than the first tick and a fourth tick on the second side of the input location further from the input location than the second tick, wherein changing the respective distances includes moving the third tick a third distance in the first direction based on the input duration and moving the fourth tick a fourth distance in the second direction based on the input duration, wherein the third distance is less than the first distance and the fourth distance is less than the second distance.

5. The method of claim 1, wherein the input is associated with an input location and an input distance moved in a direction along the timeline on a first side of the input location, wherein the plurality of ticks includes a first tick on the first side of the input location, a second tick on the first side of the input location further from the input location than the first tick, and a third tick on a second side of the input location opposite the first side, wherein changing the respective distances includes moving the first tick a first distance further away from the input location based on the input distance and moving the second tick a second distance further away from the input location based on the input distance without moving the third tick.

6. The method of claim 5, wherein the second distance is less than the first distance.

7. The method of claim 1, wherein the input is associated with an input location and an input distance moved in a direction perpendicular to the timeline, wherein the plurality of ticks includes a first tick on a first side of the input location and a second tick on a second side of the input location, wherein changing the respective distances includes moving the first tick a first distance based on the input distance and moving the second tick a second distance based on the input distance.

8. The method of claim 7, wherein:
in response to determining that the direction perpendicular to the timeline is a first direction, moving the first tick and moving the second tick includes moving the first tick and the second tick further away from the input location; and
in response to determining that the direction perpendicular to the timeline is a second direction, moving the first tick and moving the second tick includes moving the first tick and the second tick closer to the input location.

9. The method of claim 1, wherein the input is associated with a first contact and a second contact, wherein the plurality of ticks includes a first tick on a first side of an input location between the first contact and the second contact and a second tick on a second side of the input location, wherein:
  in response to determining that the first contact and the second contact are moving towards each other, changing the respective distances includes moving the first tick and the second tick closer to the input location; and
  in response to determining that the first contact and the second contact are moving away from each other, changing the respective distances includes moving the first tick and the second tick further away from the input location.

10. The method of claim 1, wherein changing the respective distances includes:
  in accordance with a determination that a first tick is not locked, moving the first tick; and
  in accordance with a determination that the first tick is locked, forgoing moving the first tick.

11. The method of claim 1, wherein the timeline is displayed over a representation of the path.

12. The method of claim 1, further comprising displaying a timeline background, wherein a display characteristic of the timeline background at a particular location along the timeline is proportional to a tick density at the particular location along the timeline.

13. The method of claim 12, wherein the display characteristic is at least one of darkness, brightness, or color.

14. The method of claim 1, further comprising displaying the animation of the object moving along the path based on timeline.

15. The method of claim 14, wherein a speed of the object moving along the path is greater where consecutive ticks are closer together and is slower where consecutive ticks are further apart.

16. A device comprising:
  non-transitory memory; and
  one or more processors to:
    display, using a display, a timeline for an animation of an object moving along a path, wherein the timeline includes a plurality of ticks, wherein each of the plurality of ticks is associated with respective distance along the timeline and a respective distance along the path, wherein the respective distance along the timeline is proportional to an amount of time for the object to move the respective distance along the path;
    receive, using one or more input devices, an input within the timeline; and
    in response to receiving the input within the timeline, change the respective distances along the timeline of two or more of the plurality of ticks and the amounts of time for the object to move the respective distances along the path of the two or more of the plurality of ticks.

17. The device of claim 16, wherein the input is associated with an input location and an input duration, wherein the plurality of ticks includes a first tick on a first side of the input location and a second tick on a second side of the input location, wherein the one or more processor are to change the respective distances by moving the first tick a first distance in a first direction based on the input duration and moving the second tick a second distance in a second direction based on the input duration.

18. The device of claim 16, wherein the input is associated with an input location and an input distance moved in a direction along the timeline on a first side of the input location, wherein the plurality of ticks includes a first tick on the first side of the input location, a second tick on the first side of the input location further from the input location than the first tick, and a third tick on a second side of the input location opposite the first side, wherein the one or more processors are to change the respective distances by moving the first tick a first distance further away from the input location based on the input distance and moving the second tick a second distance further away from the input location based on the input distance without moving the third tick.

19. The device of claim 16, wherein the input is associated with an input location and an input distance moved in a direction perpendicular to the timeline, wherein the plurality of ticks includes a first tick on a first side of the input location and a second tick on a second side of the input location, wherein the one or more processors are to change the respective distances by moving the first tick a first distance based on the input distance and moving the second tick a second distance based on the input distance.

20. A non-transitory computer-readable medium having instructions encoded thereon which, when executed by one or more processors of a device, cause the device to:
  display, using a display, a timeline for an animation of an object moving along a path, wherein the timeline includes a plurality of ticks, wherein each of the plurality of ticks is associated with respective distance along the timeline and a respective distance along the path, wherein the respective distance along the timeline is proportional to an amount of time for the object to move the respective distance along the path;
  receive, using one or more input devices, an input within the timeline; and
  in response to receiving the input within the timeline, change the respective distances along the timeline of two or more of the plurality of ticks and the amounts of time for the object to move the respective distances along the path of the two or more of the plurality of ticks.

* * * * *